United States Patent [19]
Wampler et al.

[11] Patent Number: 5,898,590
[45] Date of Patent: *Apr. 27, 1999

[54] METHOD AND APPARATUS FOR NUMERICALLY CONTROLLED PATTERN DETERMINATION

[75] Inventors: Robert R. Wampler, Augusta; Lisa D. Riley, Wichita, both of Kans.

[73] Assignee: The Boeing Company, Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/700,946

[22] Filed: Aug. 21, 1996

[51] Int. Cl.$^6$ .................. G05B 19/401; G05B 19/18; G06F 19/00

[52] U.S. Cl. .................. 364/474.16; 33/504; 33/505; 702/85; 702/150; 702/151

[58] Field of Search .................. 33/503–505, 520, 33/556, 613; 364/468, 472, 474, 551–553, 559, 560–562, 570–571, 474.16, 468.15; 382/152; 408/3, 8; 702/81, 85, 150, 151, 155, 158

[56] References Cited

U.S. PATENT DOCUMENTS

| | | | |
|---|---|---|---|
| 3,481,042 | 12/1969 | Lemelson | 33/504 |
| 4,167,066 | 9/1979 | Cooper | 33/504 |
| 4,370,720 | 1/1983 | Hyatt | 364/474.36 |
| 4,901,253 | 2/1990 | Iwano | 702/168 |

*Primary Examiner*—Robert W. Downs
*Attorney, Agent, or Firm*—Lawrence W. Nelson

[57] ABSTRACT

A probing system that checks a pattern formed by a plurality of features of an object. The system includes an input device that receives an ideal position and an ideal set of dimensions of each of the plurality of features, as well as an acceptable tolerance for the plurality of features. The input device generates a first signal. A probe device is electrically connected to the input device to receive the first signal, and in response, directs a probe to a location of samples. The probe device outputs a second signal indicative of a measured location of each of the samples. A processor is electrically connected to the probe device and the input device, and performs the operations of receiving and storing in memory the first signal indicative of the ideal position and tolerance of each of the plurality of features, receiving and storing in the memory the second signal indicative of the measured location of each of the samples from the probe device, and calculating a measured position of each of the plurality of features based on the measured location of each of the samples. The processor also offsets the stored ideal position of each of the plurality of features by a predetermined value of variance to an adjusted ideal position of each of the plurality of features, and determines whether the measured position of each of the plurality of features falls within the acceptable tolerance of the respective adjusted position of each of the plurality of features.

25 Claims, 14 Drawing Sheets

METHOD AND APPARATUS FOR NUMERICALLY CONTROLLED PATTERN DETERMINATION

BACKGROUND OF THE INVENTION

1. Field of the Invention

The present invention relates to a method and apparatus for probing a component using a numerically controlled device, and, more particularly to a method and apparatus for probing specific features on a component to determine their pattern on the component.

2. Background Information

The present invention relates to a Numerically Controlled (NC) device. As shown in FIGS. 1a and 1b, an NC device 400 often includes a platform 402 which uses support devices, shown here as stand-offs 404a–c, to hold a component 406 in a fixed position. The NC device 400 also has a chuck 408 attached to an articulating head 410 capable of pivoting about a "b" axis, as shown in FIG. 1a, as well as an "a" axis and a "c" axis, as shown in FIG. 1b. The NC device 400 moves the chuck 408 along the X-axis and the Y-axis utilizing movement of an arm 412 that travels along tracks (not shown). The chuck 408 can be repositioned along the X axis and the Y axis allowing the formation of a plurality of features, some of which can be positioned on the component 406 in a predetermined pattern. The arm 412 is also capable of moving the position of the chuck 408 along the Z-axis using a vertical track 414, shown in FIG. 1b. The chuck 408 may hold a drill, a milling tool, as well as a number of other tools typically used in precision machining. Accordingly, the NC device 400 is capable of performing a machining operation at a number of positions on the component 406 to form a predetermined pattern.

As shown in the block diagram of FIG. 2, the NC device 400 includes an input device 416 for inputting "high level" instructions designating the precise locations for machining each of the features, including those of a pattern, on the component 406. These instructions are transmitted to a post processor 418. The post processor 418 is in communication with a machine control unit (MCU) 422 of the NC device 400. The post processor 418 adapts the "high level" instructions of the input device 416 to the specific requirements of the NC device 400 and its MCU 422, and outputs a work piece instruction understandable to the MCU 422. The instructions from the post processor 418 are stored in a memory 420. The memory 420 can either be part of the NC device 400, as is the case when the NC device 400 is a computer numerical control (CNC) device having its own dedicated individual computer, or the memory 420 can be located remote from the NC device 400, as is the case when the NC device 400 is a direct numerical control (DNC) device. In the case where the NC device 400 is a DNC device, a remote computer such as a mainframe or UNIX® workstation will hold the instructions from the post processor 418 in a separate memory until accessed by the MCU 422.

To operate the arm 412 and the articulating head 410 of the NC device 400, shown in FIG. 1a, the MCU 422 sequentially accesses work piece instructions from the memory 420 and then translates these instructions into signals directly actionable by the NC device 400. For example, if the instruction is to move the chuck 408 to a first hole location of a predetermined pattern at a position some n number of units along the X-axis, then the MCU 422 will apply a voltage to at least one of motors 424a–424e to drive the arm 412 along the track (not shown) on the platform 402, until it has moved the designated number of n units. In an open loop system, a known amount of travel will be performed by the motors 424a–424e, preferably stepping motors, when a given voltage for a given duration is applied to the motors 424a–424e. On the other hand, in a closed loop system, the MCU 422 will apply the signal voltage until a sensing device (not shown) determines that the arm 412 has traveled the designated number of units. Thus, in a closed loop system, the articulating head 410 moves in response to instruction from the MCU 422 and then the sensing device (not shown) indicates to the controller 422 when the desired position has been reached.

The movement of the chuck 408 some n number of units along the Y-axis is accomplished by the MCU 422 in the same manner as was the X-axis. Once the position of the first hole has been located along the X-axis and the Y-axis the MCU 422 applies a voltage to at least one of the motors 424a–424e to drive the chuck 408 along the vertical track 414 to a desired depth within the component 406. The MCU 422 repeats this process for each feature in the pattern.

Once the NC device 400 has completed a plurality of operations to form various features within the component 406, including the formation of at least one predetermined pattern, the accuracy of each of the operations must be checked. Then, the predetermined pattern formed on the component 406 must be compared with the composite tolerances of the pattern to determine if the pattern was formed within acceptable limits.

One method of ensuring that the features, as well as the predetermined pattern, machined on the component 406 are in tolerance is to remove the component 406 from the stand-offs 404a–404c and transfer the component 406 to a coordinate measurement machine (CMM) (not shown). However, when the component 406 is large, such a transfer becomes exceedingly difficult and may cause the component 406, and thereby the pattern on the component 406, to permanently distort by warping or drooping. Further, the CMM tends to be expensive to purchase and operate, so there are usually only a few available at a manufacturing facility. This causes long queues and delays before the component 406 can be checked. When using the CMM (not shown) to determine if a pattern on the component 406 is within tolerance, an offset is chosen to compensate for machining variations and axial differences before comparing ideal pattern dimensions with measured pattern values. Once the offset has been determined, each feature is sequentially probed, and then the dimensions and center of the feature are calculated. The data indicating the center of each feature are then offset by the amount chosen. The features in the ideal pattern as offset are then compared with the measured pattern values. If one of the features, such as a hole, is found to be out of tolerance, then a new offset is chosen, and the CMM probes each hole all over again. The center values of the new probing are then offset with the new value to determine if the pattern is in tolerance. This lengthy procedure is repeated over and over until all features are found to be tolerance or until all reasonable offset values have been tried. Thus, if the first few offsets calculated lead to poor tolerance measurements of at least one of the features, then each time a new offset is calculated, every single feature in the pattern on the component 406 must be physically re-measured. Further, if every attempt to obtain acceptable tolerances using different offsets fails, the CMM has no way to determine which offset yielded the best results, i.e., the offset yielding the least number of features in the pattern that were out of tolerance.

For the foregoing reason, there is a need for an apparatus and a method that can determine if a pattern machined onto a component is within tolerance without requiring the resampling of data once it has been acquired. Further, the apparatus and method should provide the best pattern data available, even if some features of the pattern are out of tolerance. The probe technology should accomplish the above objectives by utilizing a plurality of data to determine if the component 406 is acceptable. Finally, the apparatus and method should allow the probing of the component 406 to be conducted by the NC device that machined the component, to forego the delays and distortions caused when the component is transferred to a CMM.

SUMMARY OF THE INVENTION

In accordance with one aspect, the present invention relates to a probing system that checks a pattern formed by a plurality of features of an object. The system includes an input device that receives an ideal position and an ideal set of dimensions of each of the plurality of features, as well as an acceptable tolerance for the plurality of features. The input device generates a first signal indicative of an amount of samples and a location of each of the samples for the plurality of features. The systems also includes a probe device having a probe. The probe device is electrically connected to the input device to receive the first signal from the input device, and in response, directs the probe to the location of each of the samples. The probe device outputs a second signal indicative of a measured location of each of the samples. The system further includes a processor having a memory. The processor is electrically connected to the probe device and the input device. The processor performs the operations of receiving and storing in the memory the first signal indicative of said ideal position and tolerance of each of the plurality of features, receiving and storing in the memory the second signal indicative of the measured location of each of the samples from the probe device, calculating a measured position of each of the plurality of features based on the measured location of each of the samples, predicting a predetermined value of variance between the measured position and the ideal position of each of the plurality of features, offsetting the stored ideal position of each of the plurality of features by the predetermined value of variance to an adjusted ideal position of each of the plurality of features, comparing the measured position of each of the plurality of features with the respective adjusted ideal position of each of the plurality of features, and determining whether the measured position of each of the plurality of features falls within the acceptable tolerance of the respective adjusted position of each of the plurality of features.

In accordance with another aspect, the present invention relates to a method of determining whether a pattern having a plurality of features is within an acceptable tolerance. The method includes the steps of inputting an ideal position for each of the plurality of features, storing the ideal position for each of the plurality of features, measuring a position of each of the plurality of features, and storing the measured position of each of the plurality of features. The method also includes the steps of predicting a predetermined value of variance between the measured position and the ideal position of each of the features, offsetting the stored ideal position of each of the plurality of features by the predetermined value to an adjusted ideal position for each of the plurality of features, comparing the measured position of each of the plurality of features with the respective adjusted position of each of the plurality of features, and determining whether the measured position of each of the plurality of features falls within the acceptable tolerance of each of the respective adjusted ideal position of each of the plurality of features.

In yet another aspect, the present invention relates to a method of machining a desired pattern into a component and then probing the component to determine if the machined pattern on the component is within an acceptable tolerance of the desired pattern. The method uses an NC machining system having an input device, machining attachments, a probing device and a processor. The method comprises the steps of inputting an ideal position and dimensions of each of a plurality of features of the desired pattern into the input device, machining each of the plurality of features into the component with the machining attachments in accordance with the position and dimensions of each of the plurality of features to form the desired pattern, and probing each of the plurality of features machined into the component to acquire a measured position of each of the plurality of features forming the machined pattern on the component. The method also includes the steps of storing the measured position of each of the plurality of features forming the machined pattern, aligning the ideal position of each of the plurality of features of the desired pattern with the stored measured position of each of the plurality of features of the machined pattern to form an aligned ideal pattern, and comparing the machined pattern and the aligned ideal pattern to determine if the machined pattern is within the acceptable tolerance.

BRIEF DESCRIPTION OF THE DRAWINGS

These and other features, aspects, and advantages of the present invention will become better understood with reference to the following description, appended claims, and accompanying drawings, where:

DESCRIPTION OF THE PREFERRED EMBODIMENT

Figure 1A:
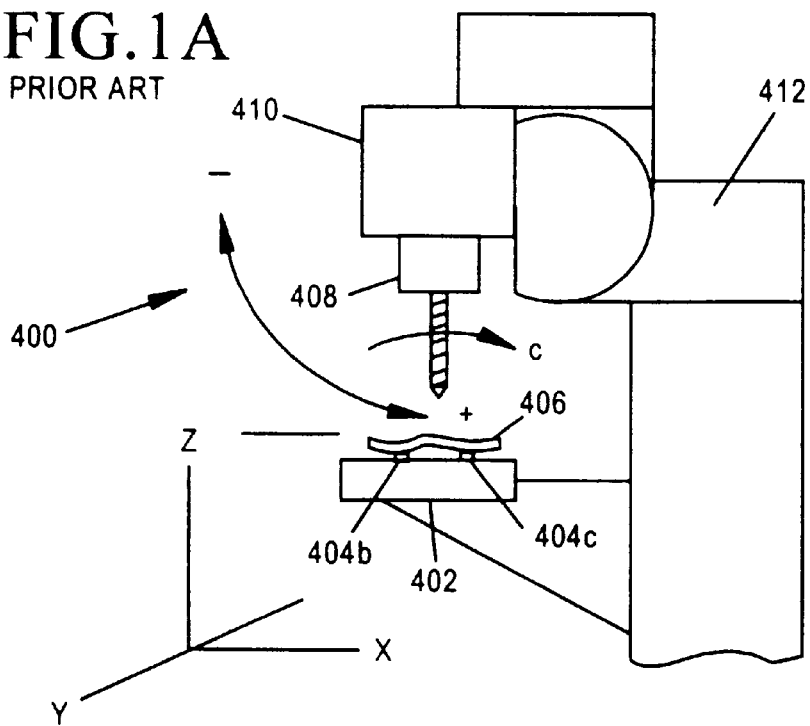
FIG. 1*a* shows a side view of a conventional Numerically Controlled (NC) device.
Figure 1B:
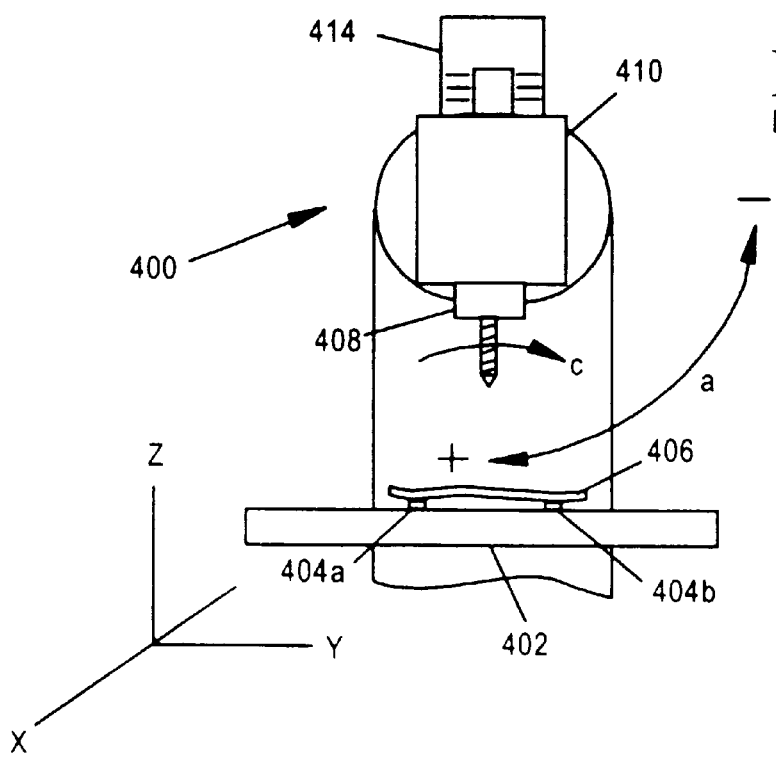
FIG. 1*b* shows a front view of a conventional Numerically Controlled (NC) device.
Figure 2:
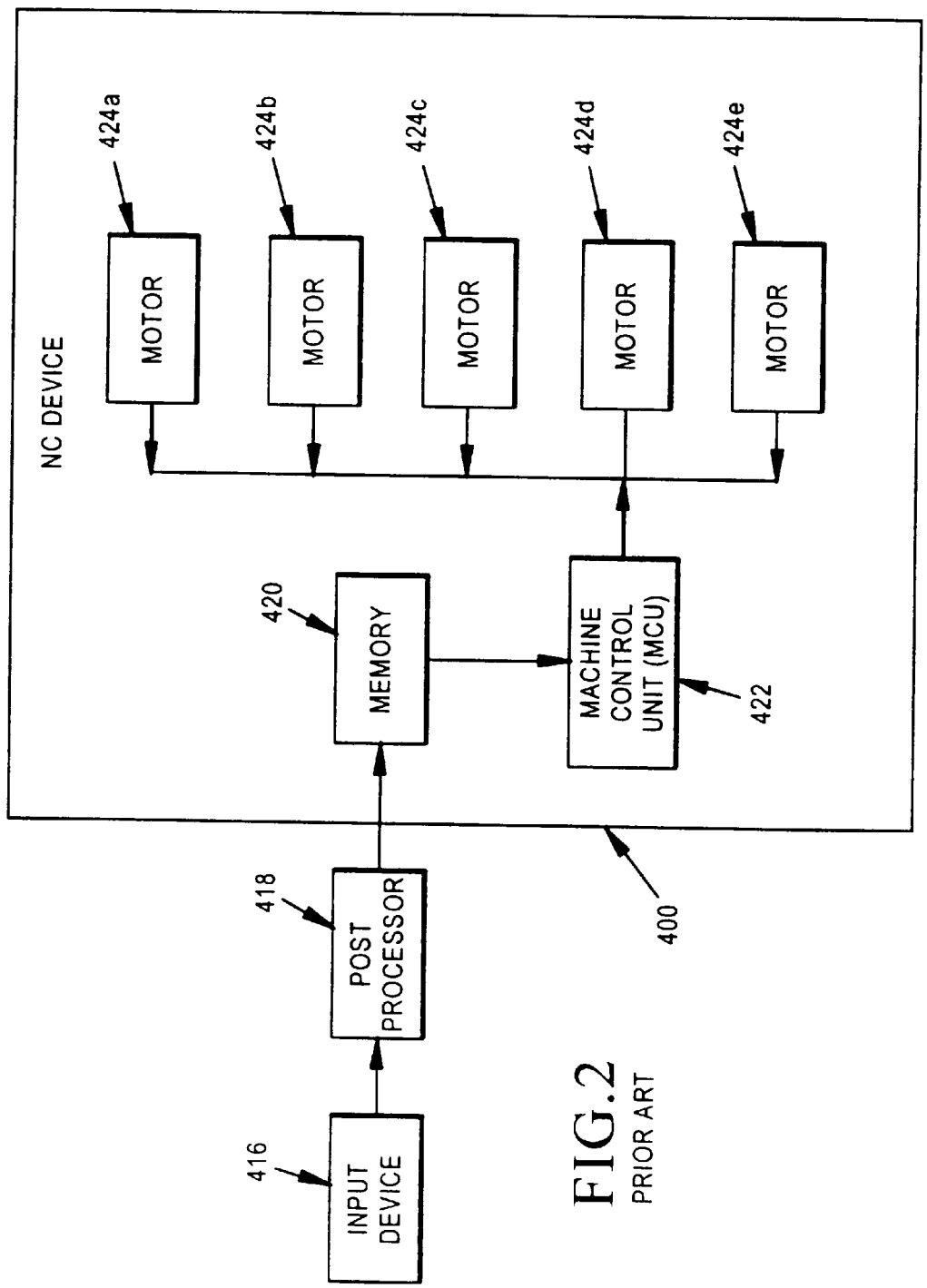
FIG. 2 shows a block diagram of components included in the conventional Numerically Controlled device.
Figure 3:
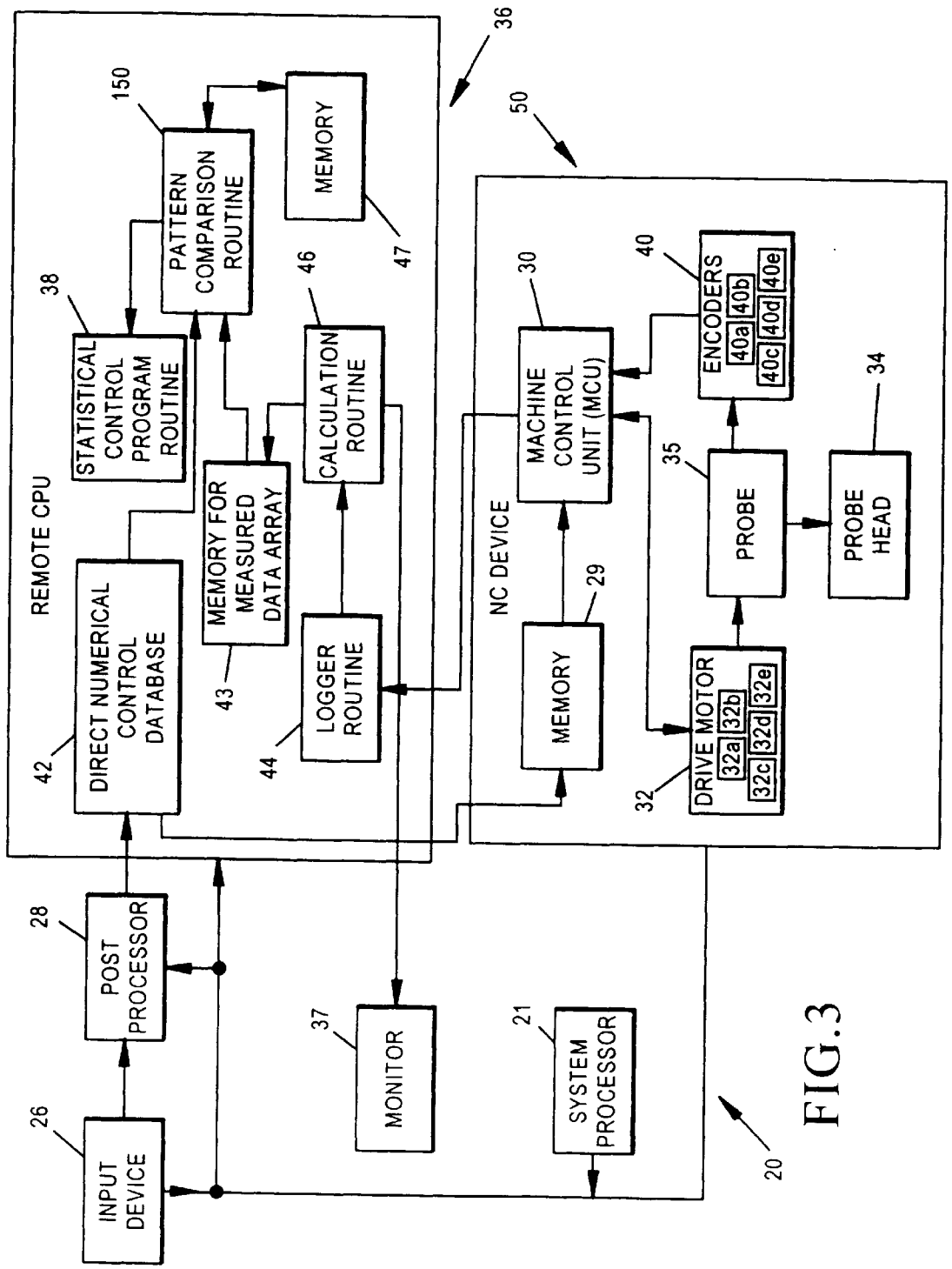
FIG. 3 shows a block diagram of a probing and pattern determining system using a Numerically Controlled device.

As shown in the block diagram of FIG. 3, an NC probing and pattern determining system 20 includes an input device 26 for inputting ideal positions and dimensions of a plurality of features some of which are arranged in a pattern being probed. The ideal positions and dimensions are used to measure the positions and dimensions of the features of the pattern. The measured positions and dimensions are then compared to the ideal positions and dimensions to determine whether the pattern and features are within specified tolerances. The process begins when a post processor 28, also included in the NC system 20, outputs a series of work piece instructions for measuring the pattern at specified data points. The work piece instructions are then stored in a remote CPU 36.

The system 20 also includes a numerically controlled (NC) device 50 having a machine control unit (N4CU) 30 that processes the work piece instructions stored in the remote CPU 36. The NC device 50 also has motors 32*a*–32*e*, which are driven by the MCU 30 to move a probe head 34. Further, the NC device 50 includes encoders 40*a*–40*e* that determine a position of the probing head 34 and then store the position in the remote CPU 36. A calculation routine 46 is used by the remote CPU 36 to calculate the positions and dimensions of features as well as the patterns of features being measured by the NC probing system 20 based on data provided by the encoders 40*a*–40*e*. The calculation routine 46 stores these values in a memory 43. A pattern comparison routine 150 then compares the measured positions and dimensions in memory 43 against the ideal positions and dimensions to determine if the features and the patterns are within tolerance. Further, the system 20 includes a monitor 37 that displays the dimensions of each of the features and indicates whether the pattern is in tolerance and if not which features are out of tolerance. The system 20 also includes a statistical process control program 38 residing in the remote CPU 36 to sample the measurement results over time to look for trends in machining tolerance. Finally, a system processor 21 regulates the transfer and processing of information between the input device 26, the post processor 28, the remote CPU 36 and the NC device 50.

The input device 26 is a computer-aided design (CAD) device, such as a PRO-E® terminal, AUTO-CAD® or CATIA® station. Information, such as an ideal design of a component 53, shown in FIG. 5 including the ideal positions and dimensions of all its essential features as well as the pattern formed by at least some of those features, is input by an operator into a definition file in an operating sequence, which is sequential numbers each feature as it is input. The definition file is used as a template to assist in the acquisition of actual measured values of a component 53. The definition file specifies feature dimensions and feature positions for each feature in the operating sequence and the existence and placement of any pattern formed by the features. The definition file also specifies the tolerances of each feature and the amount that the actual measured values of the pattern can deviate from the ideal dimensions of the pattern. Also, an amount of data points sampled by the probe head 34, per each feature measured on the component 48, is specified in the definition file. Once the definition file has been completed, the input device 26 outputs a "high level" instruction designating which of the features and which of the patterns on the component 48 are to be measured.

The post processor 28, as is well known in the art, is a computing device that converts or adapts the "high level" instruction output from the input device 26 into a series of the work piece instructions that can be understood by the MCU 30 of the NC device 50. The post processor 28 uses the definition file described in the "high level" language to create two separate files. The first file created by the post processor 28 is an ideal measurement file, which defines the ideal dimensions of each feature in the operating sequence as well as the ideal dimensions of any pattern of features within the operating sequence. The second file created by the post processor 28 is a probe head destination file. The second file designates each feature in the operating sequence that is to be probed, and an expected location of the center of each of the features in the operating sequence into which the probe head 34 is to drop. The post processor 28 creates the second file by manipulating the ideal dimensions of each feature to move the probe head 34 to a plurality of lateral destination points away from the center once the probe 34 has been lowered into or beside the feature. The destination points are manipulated to lie beyond an expected point of contact for each of the data points of the features. The work piece instructions, which contain the first and second files, are transferred to the remote CPU 36 upon request.

The remote CPU 36 is preferably a computer having substantial computing and memory capacity, such as a UNIX workstation, PC, or mainframe. The CPU 36 maintains a direct numerical control (DNC) database 42 that is accessible by the MCU 30. The DNC database 42 is the portion of the CPU 36 responsible for storing the series of the work piece instructions created by the post processor 28. In a preferred embodiment, the CPU 36 is in communication with a plurality of NC devices each having access to the information in the DNC database 42.

The remote CPU 36 is also capable of running a logger routine 44 that stores all the positional values determined by the encoders 40*a*–40*e*. Further, the remote CPU 36 is capable of running the calculation routine 46 which calculates actual specified measurements of the features, such as diameter, center, and location of the center of each feature, using the positional values determined by the encoders 40*a*–40*e*. The CPU 36 is also capable of running the pattern comparison routine 150, which compares the position of the features of the pattern in the ideal measurement file with the calculated position of the features of the pattern as measured by the encoders 40*a*–40*e*.

Upon instruction, the series of the work piece instructions stored in the DNC database 42 are transferred to the MCU 30 of the NC device 50. In a preferred embodiment, the NC device 50 is a computer numerically controlled (CNC) device having a memory 29 that is capable of receiving all the work piece instructions and storing them. The MCU 30 of the NC device 50 sequentially retrieves each of the series of the work piece instructions, and in response outputs a voltage to at least one of the motors 32*a*–32*e* to move the probe head 34. The probe head 34 is preferably a contact type probe head, such as a standard Renishaw touch type probe head sensor.

The probe head 34 is initially moved along the z-axis toward the surface of the component 53 at a central position of a particular feature in the operating sequence that is being measured. For each feature, there are a plurality of destination points, each destination point corresponds to the data point currently being processed. The probe head 34 is moved laterally until it comes into contact with the surface of the feature being measured. When the probing head 34 indicates it has made contact with the feature of the component 53, a location of the contact is determined by encoders 40*a*–40*e*.

The location of the probe head 34 is reported by the encoders 40*a*–40*e* to the MCU 30, as is well known in the art when using a "closed loop" system. The encoders 40*a*–40*e* preferably include a light emitting diode (LED) transmitter (not shown), a charge coupled device (CCD) receiver (not shown), and a slotted bar (not shown) located along each axis. Breaks in a light beam from the at least one of the LEDs, which are caused by their corresponding slotted bar interposed between the LED and the CCD, indicate the amount of movement of the probe head 34 parallel to the bar along that particular axis. Further, the MCU 30 is programmed with a G-code, which is one of a group of codes that specify the relationship of the NC device 50 to the component 53. The programmed G-code, in this case G31, is input into the MCU 30 directing it to take a reading from encoders 40a–40e to determine the exact position of the probe head 34 when it makes contact with the surface of the component 48. This recorded position is then sent to the logger routine 44 in the remote CPU 44, where it is stored along with all other data point positions determined by the MCU 30. Once all the destination points for a feature in the operating sequence have been determined, the data is tagged to indicate that it is paired with the particular feature of the operating sequence. The probe 35 is then retracted and moved to a new central position corresponding to the next feature in the operating sequence.

Once the locations of all the data points of each feature in the operating sequence have been determined and stored by the logger routine 44, the CPU 36 invokes the calculation routine 46. Initially, the calculation routine 46 calculates the dimensions and position of each feature in the operating sequence. For example, if the feature is a hole, the calculation routine will determine its diameter, and its center point. The position of a feature is tagged with the feature's identification point, which indicates its location in the operating sequence.

After the CPU 36 uses the calculation routine 46 to calculate the position of certain dimensions of each feature in the operating sequence, it then uses the pattern comparison routine 150 to search for any patterns, indicated by flags, that have been intentionally formed by common features. Once the existence of a pattern has been determined, the CPU 36 begins operating at the identification point corresponding to the first feature of the pattern in the operating sequence. The first identification point in the operating sequence is designated as the anchor point. Next, the identification point corresponding to the last feature of the position in the operating sequence is then designated as an orientation point. As performed for the measured positions, the first and last identification point in the operating sequence of the ideal file are retrieved and stored. Then, the CPU 36 uses the pattern comparison routine 150 to create an array of data including ideal and measured dimensions, positions, and tolerances of each of the features. By storing the ideal and measured dimensions and positions for each feature in the pattern within a special array, this data can be continuously manipulated without any requirement that the features be remeasured by the probe 35. Further, by storing the measured data, the data does not need to be recalculated to determine the measured dimensions and positions of the features, each time the data is used.

The use of the array allows the data to be manipulated so that various different alignments of the pattern defined by the ideal measurement file, and the pattern defined by the calculated data, can be attempted until an alignment which shows all measured positions to be in tolerance with the ideal positions is found. If at least one feature is always out of tolerance in the pattern, then an alignment that yields the least number of out of tolerance features can be determined. The ideal positions are shifted by an offset to align the measured features in the pattern with the ideal features. The offset is calculated by forming a vector between the anchor point and the orientation point of the measured feature position, then a vector between the anchor point and the orientation point of the ideal feature position. The two vectors are then compared to determine the angular offset that exists between the measured positions and the ideal positions. The ideal positions of each feature are recalculated by setting the ideal anchor point equal to the position of the measured anchor point and then rotating the ideal positions by the angular offset to in effect axially align the ideal positions with the measured positions. The ideal positions are rotated by creating an adjusted ideal pattern, where each position in the ideal file is extracted, recalculated based on the offset rotational angle and then stored as an independent file. By substituting the position of the ideal anchor point with the position of the measured anchor point and then recalculating all the other adjusted features based on distance from the new anchor point, no transverse offset of the adjusted ideal pattern is needed.

The adjusted ideal pattern is then compared with the measured pattern by comparing the distance and angle formed by each measured feature to the measured anchor hole with the corresponding distance and angle in the adjusted ideal pattern. Each feature is tested to determine if it is in tolerance with its corresponding ideal pattern. Each time an out of tolerance hole is found, the feature in the adjusted ideal pattern is flagged, and each hole that is out of tolerance is counted. If even one feature is found to be out of tolerance, a new orientation point, usually the identification point preceding the former orientation point is selected from the measured data and a new rotational angular offset is calculated using the new orientation point. Then, a new adjusted ideal pattern is again calculated and compared with the measured data to check if this alignment yields a result where all the features are in tolerance. This continues until an offset is found that yields a comparison where all holes are in tolerance. This process may be analogized to the angular shifting of a stencil over a drawing that is performed until an offset yielding a perfect alignment is found, or an offset that yields the least amount of deviation is found, and then the values calculated with that offset are used. The data yielding an in tolerance condition is then output. However, if no comparison yields all features as being in tolerance, then all comparisons are checked to determine which one provided the least amount of out of tolerance features, this data along with the number and position of the out of tolerance features is then output. The final measurements and conformance or variation from tolerances are then formatted and stored in a file within the remote CPU 36 for later display.

The monitor 37 displays whether the measured pattern is in tolerance. The measurements calculated by the calculation program 34, as well as the deviations of any feature out of tolerance in the pattern are also displayed on the monitor 37. Further, the statistical process control program 38 located in the remote CPU 36 is capable of inputting the stored files of pattern comparison routine 150 from machining operations occurring over a period of time. The files are examined to look for trends in the data output over time, and is capable of assisting in the determination of when a particular tool, such as a drill, of the NC device 50 should be replaced.

Figure 4:
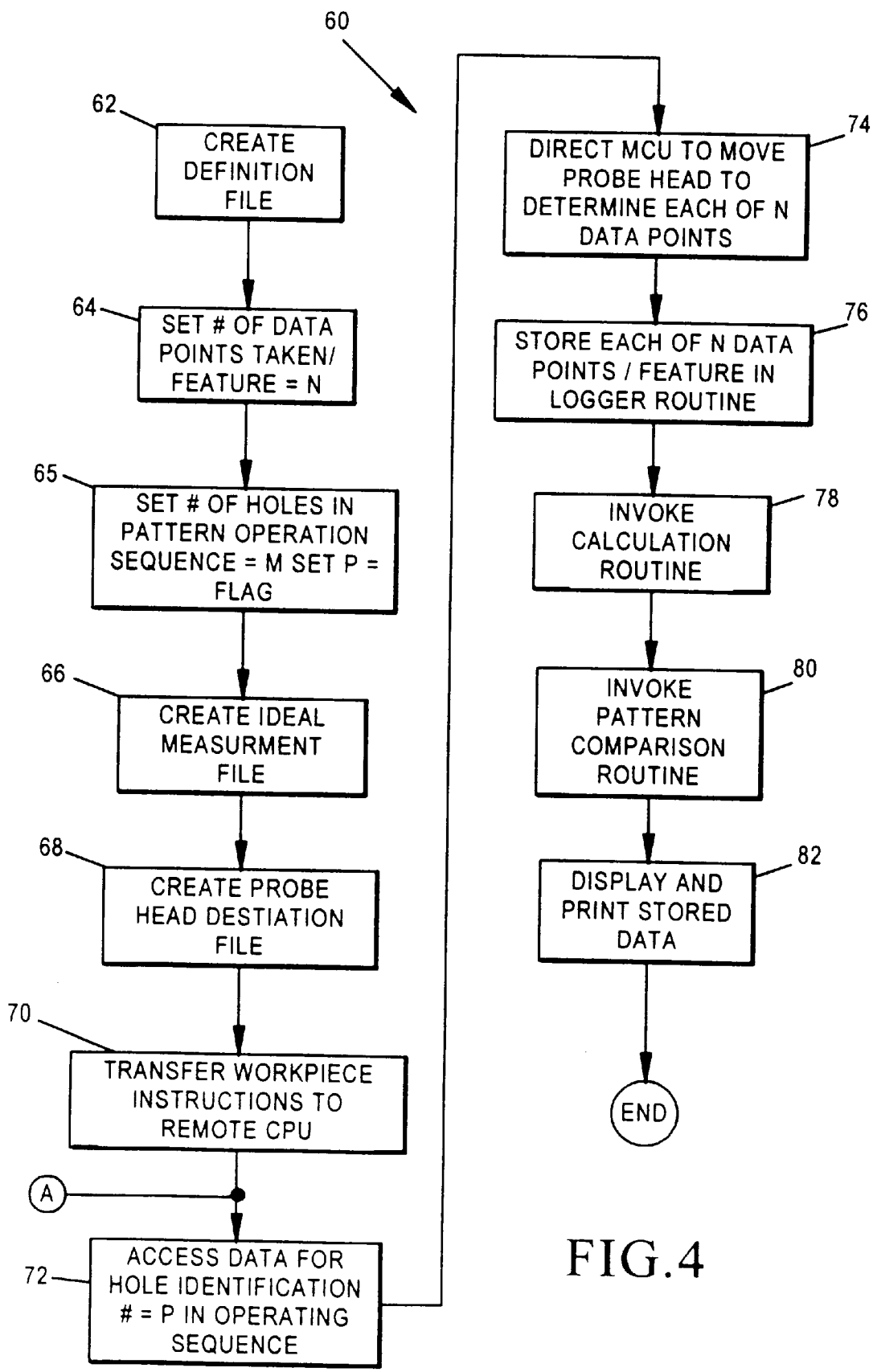
FIG. 4 shows a flow chart depicting a main routine implemented by a system processor of the probing and pattern determining system.
Figure 5:
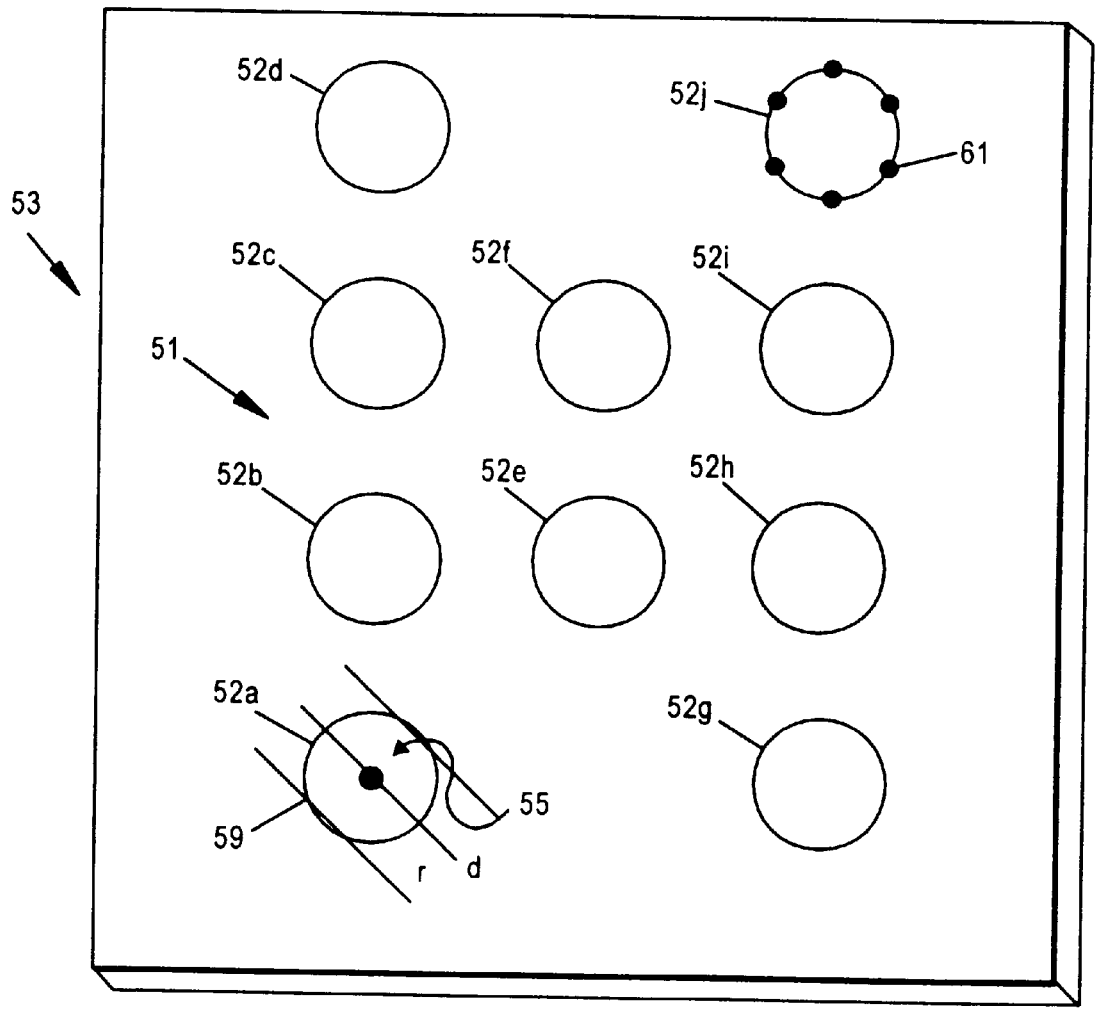
FIG. 5 shows an isometric view of a pattern of holes in a component.

In a first embodiment, the probing system 20, as shown in FIG. 3, is used to ascertain whether a pattern 51 of holes 52a–52j in the component 53, as shown in FIG. 5, is within specified tolerances. Initially, each hole in the pattern 51 is probed by the probe head 34 to locate the position of data points in the hole. The data points are used to calculate the center point 55 and diameter (d) of each of the holes 52a–52j in the pattern 51. Then, the pattern 51 is checked to see if it falls within the specified tolerances. FIG. 4 shows a series of program instruction coordinated by the system processor 21 to direct the probing and measurement of each of the holes 52a–52j as well as to determine whether the overall pattern 51, as measured, falls within the specified tolerances. Flowcharts from which source code can be written by one skilled in the art are illustrated in FIGS. 4, 7, 8, and 9a–9h.

Referring to FIG. 4, a main routine 60, which is executed by the system processor 21, shown in FIG. 3, begins at step 62 by creating a definition file in the input device 26. The input device 26 specifies the ideal dimensions of each of the holes 52a–52j, in this case an ideal center point and diameter are specified. Further, the definition file indicates the position of the center point of each of the holes 52a–52j with respect to the machine axis of the NC device 50. Also, the acceptable tolerance of the ideal dimensions of each of the holes 52a–52e as well as the overall composite pattern tolerances from hole to hole are specified in the definition file. Next, the number of the data points 61 to be taken along the inner surface of each of the holes 52a–52j, as determined by an operator, is input to the device 26 by the system processor 21 in step 64. In a preferred embodiment, 6 of the data points 61, are chosen to sample the inner surface of each of the holes 52a–52j, as shown in FIG. 5. Once input, the definition file and the number of data points are described in the "higher" level language of the input device 26, shown in FIG. 3, which is preferably a CAD workstation.

In step 65, the system processor 21 sets the total number of holes equal to a value m. Each feature of the component 53 that is probed by the head 34 is considered a value or identification point in the operating sequence comprising all the features on the component 53. In the present embodiment only holes within a single pattern are represented in the operating sequence. However, the operating sequence can comprise a plurality of features including holes, cylinders, edges, surface, etc. Further, one or more patterns of features may be embedded within the operating sequence as only a portion of the operating sequence. Once the system processor 21 locates an embedded pattern with the assistance of a flag, the pattern will be represented by a specified number of consecutive features. In step 65, the system processor 21 also initializes hole counter p equal to one. This allows the processor 21 to process the data for every hole p to hole m in the operating sequence for the pattern 51 being checked.

In step 66, the system processor 21, shown in FIG. 3, transfers the "high level" language utilized in creating the definition file to the post processor 28. The post processor 28 creates an ideal measurement file, which describes the ideal diameter and tolerances of each of the m holes 52a–52j, as a series of work piece instructions in machine code data (MCD) such as the language APT (automatic programming of tools) that can be understood by the MCU 30. The ideal measurement file also contains the position of the center point of each of the holes relative to the machine axis of the NC device 50.

Next, in step 68, the system processor 21 transfers the definition file created by the input device 26 to the post processor 28 a second time. This time the post processor 28 creates the probe head destination file which is also a series of work piece instructions in the same MCD as the ideal measurement file. The probe head destination file calculates the distance expected between data points and the center point of a hole taken along the ideal diameter (d) for each of the holes 52a–52j, and then adds some distance to them to create a series of destination points lying beyond the anticipated inner surface of each of the holes 52a–52j. For example, if the distance between the center point 55 and a point on the inner surface 59 is "r", as shown in FIG. 5, then the destination distance for the corresponding data point is set to 2*r from the center point 55. The probe head destination file also sets the spacing between the data points as equidistant around the circumference of the hole. Thus, if 6 data points 61 have been requested in step 64, then each data point will be spaced 360 degrees/6=60 degrees around the hole 57, as shown in FIG. 5.

Next, in step 70, the system processor 21 transfers all the work piece instructions including the ideal measurement file, and the probe head destination file to the direct numerical control (DNC) database 42 of the remote CPU 36 as shown in FIG. 3. The DNC database 42 is capable of communication with a plurality of NC devices. In the present embodiment, the DNC database 42 is accessible by the memory 29 of the NC device 50. In step 72, the system processor 21 accesses the probe head destination file and retrieves the destination data and location for hole p, the first hole in the pattern within the operating sequence, in this case p=1, and transfers all the pertinent work piece instructions to the memory 29.

Figure 6:
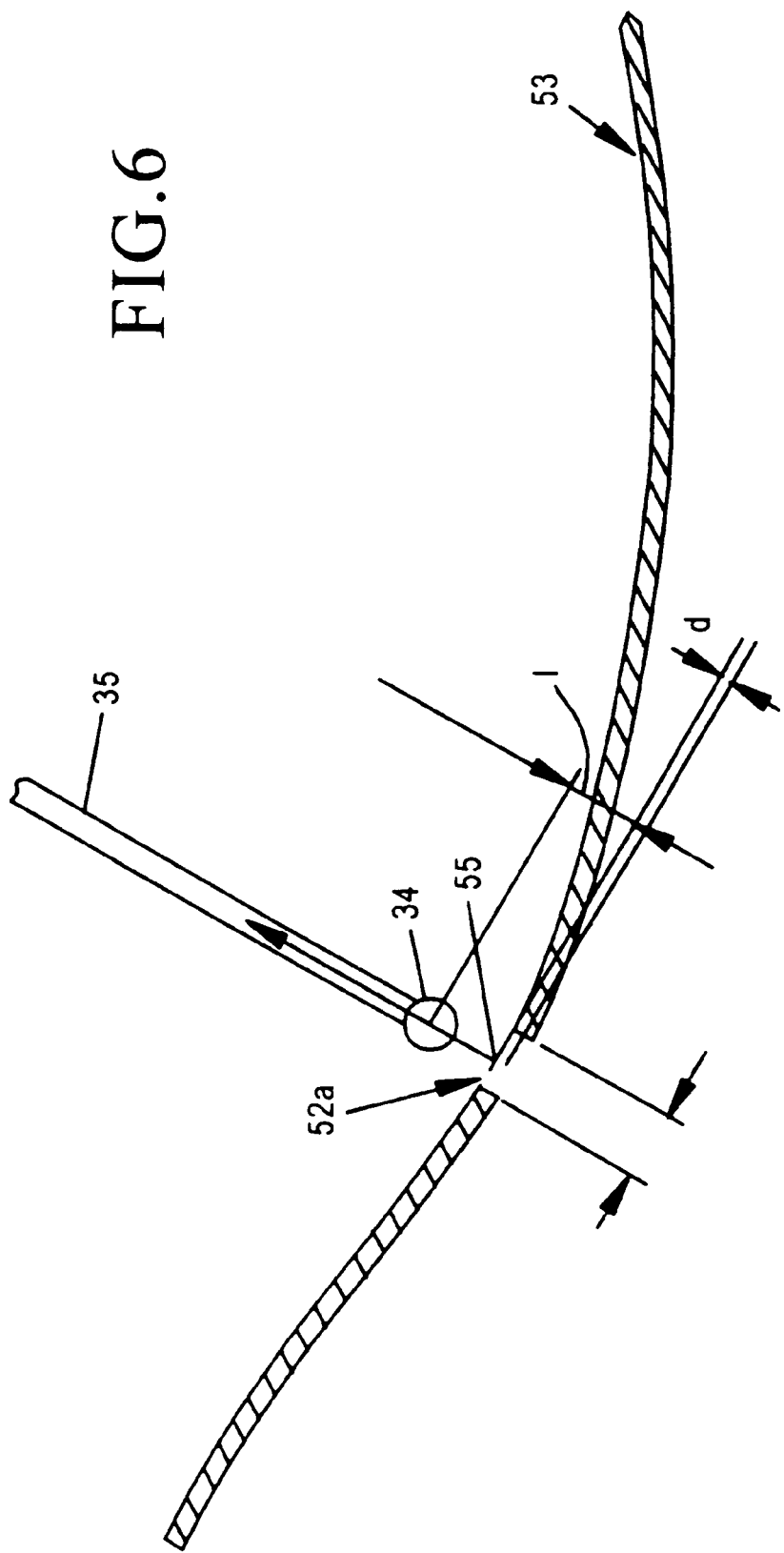
FIG. 6 shows a side view of a probe being used to inspect a hole in the component.

In step 74, the MCU 30, as shown in FIG. 3, proceeds to send out a voltage to at least some of driving motors 32a–32e to move the probe head 34 according its the work piece instructions in memory 29. First, the probe head 34 is moved to the location of hole p. This hole p has an identification number in the operating sequence equal to the first identification number in the pattern plus (p-1). Next, the MCU 30 proceeds to move the probe head 34 toward the component 53, as shown in FIG. 6.

The probe 35 is moved at high speed toward the component 53 until it has reached approximately three quarters the distance to the hole p, i.e. one of holes 52a–52j. Then, the probe 35 is slowly lowered a distance "1" on a path along the ideal center point 55, until it has theoretically penetrated the hole a distance "d", as defined by the work piece instructions. Next, the probe head 34 is moved to its first destination corresponding to a first data point, defined by the destination file. If the probe 35 reaches its destination, an error signal indicator (not shown) is lit to alert the operator that the probe 35 did not penetrate the hole 52a as intended. If, however, the probe 34 did penetrate the hole, then the probe 35 will be prematurely stopped and its position determined by at least one of encoders 40a–40e. This movement from the center point 55 to a destination will be repeated for every data point until the position of each data point has been determined.

In step 76, the system processor 21 stores the position of each of the data points along the (x, y, and z) axes in the logger routine 44 of the remote CPU 36. Next, in step 78, the system processor 21 causes the remote CPU 36 to invoke the calculation routine 46, as shown in FIG. 7, which calculates the actual center point 55 of the hole 52 and its diameter 57 as measured by the probe head 34.

Figure 7:
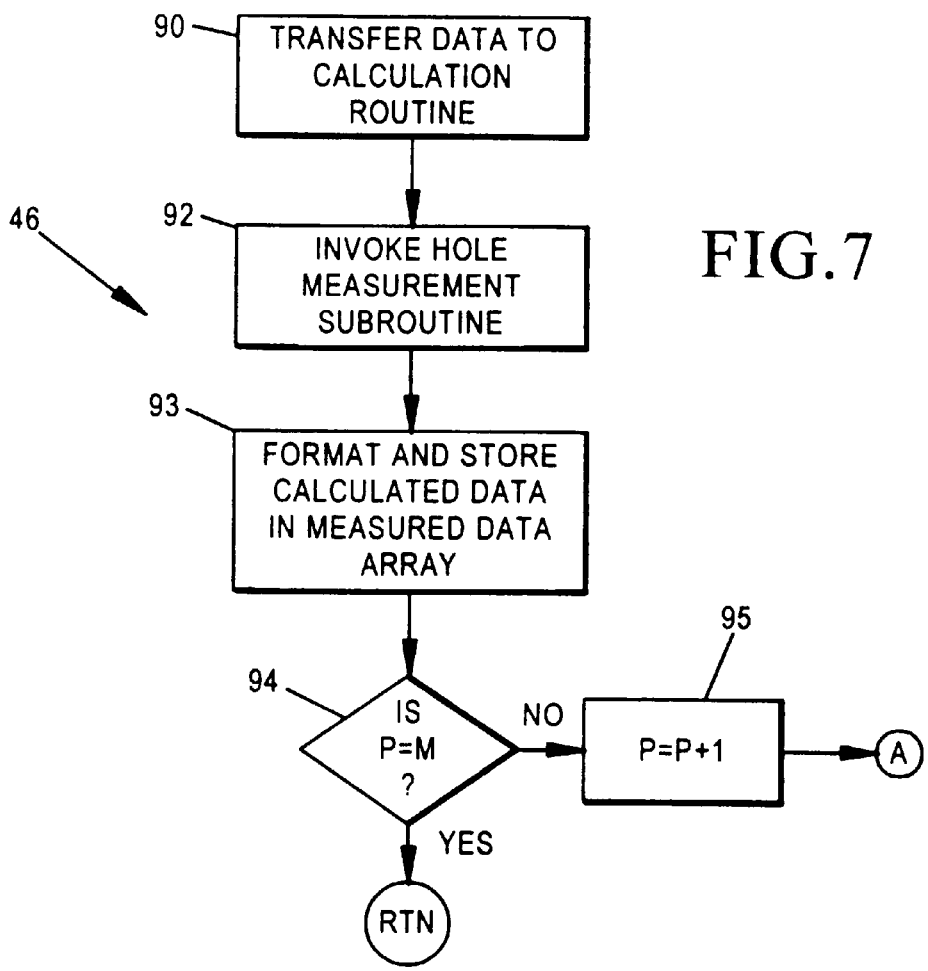
FIG. 7 is a flow chart showing a calculation routine of a first embodiment implemented by a remote Central Processing Unit (CPU)
Figure 8:
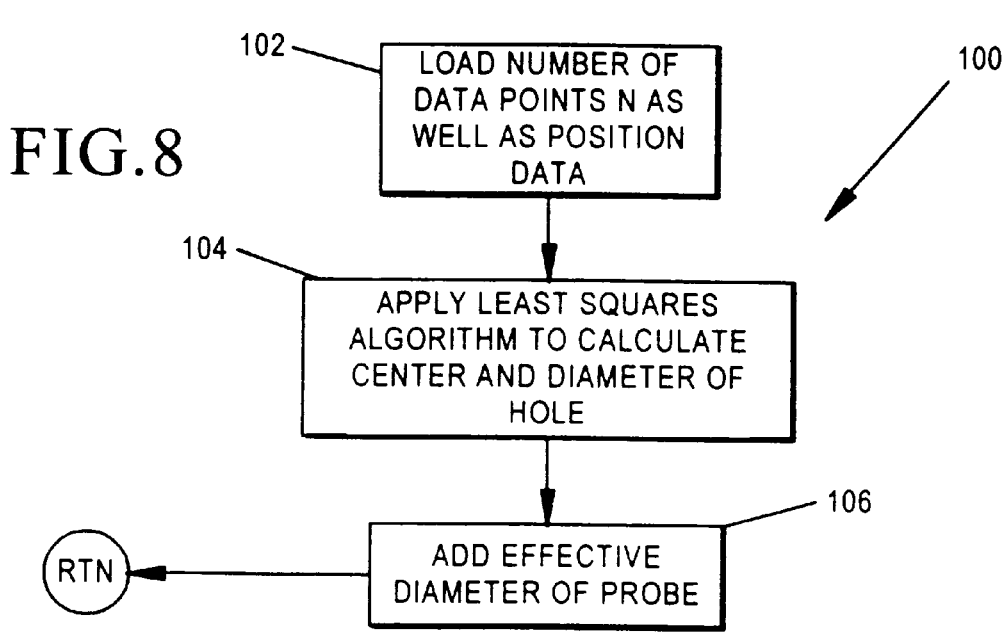
FIG. 8 is a flow chart showing a hole measurement subroutine invoked by the calculation routine.

Initially, as shown in FIG. 7, the remote CPU 36 begins the calculation routine 46 at step 90 by loading in the positions of the data points that have been stored in the logger routine 44 as well as relevant portions of the ideal measurement file and transferring them to the calculation routine 46. Next, in step 92, the remote CPU 36 invokes a hole measurement subroutine 100, shown in FIG. 8.

The hole measurement subroutine 100, invoked by the remote CPU 36 during the calculation routine 46, starts at step 102, where it enters the "n" number and position of the data points taken in the hole p. In step 104, the CPU 36 calculates the diameter and center of the hole p, as measured, using a series of simultaneous equations commonly referred to as a "least squares algorithm," which is well known in the art. The remote CPU 36 then proceeds to step 106, where the offset of position and diameter measurements due to the size of the probe head 34 are compensated for by adding the effective diameter of the probe head 34 to the calculated diameter. The CPU 36 then proceeds from the measurement subroutine 100 back to step 92 of the calculation subroutine 46, shown in FIG. 7. The CPU 36 then moves onto step 93 where it formats and stores the calculated data within memory for a storing measured data array 43, shown in FIG. 3, and then proceeds to step 94.

In step 94, the CPU 36 checks to see if the hole calculated was the last hole in the operating sequence, i.e., p=m. If p=m, then the CPU 36 returns to step 78 of the main routine 60, shown at FIG. 4. However, if the CPU 36 determines that the hole last operated on was not the last hole in the pattern, then the CPU 36 proceeds to step 95 where it increments the value of p by one and returns to step 72 of the main routine 60, where it loads the destination data and hole location for the next hole in the operating sequence. The CPU 36 continues this cycle until all the actual measured diameters and centers for each hole in the operating sequence have been calculated and stored in the measured data array 43. Once the location of the measured center point for each of the holes in the operating pattern has been calculated by the calculation subroutine 46, the CPU 36 proceeds to step 80 of the main routine 60.

In step 80 of the main routine 60, the CPU 36 invokes a pattern comparison routine 150, shown in FIGS. 9a–9g, which compares the location of each hole center in the ideal file with the hole centers calculated from actual measurements, and determines if the measured pattern is within acceptable tolerance. The pattern comparison routine 150 has direct access to the measured positional and dimensional data stored in the measured data array 43, as well as the ideal positional and dimensional data and the tolerance data located in the DNC data base 42.

Figure 9A:
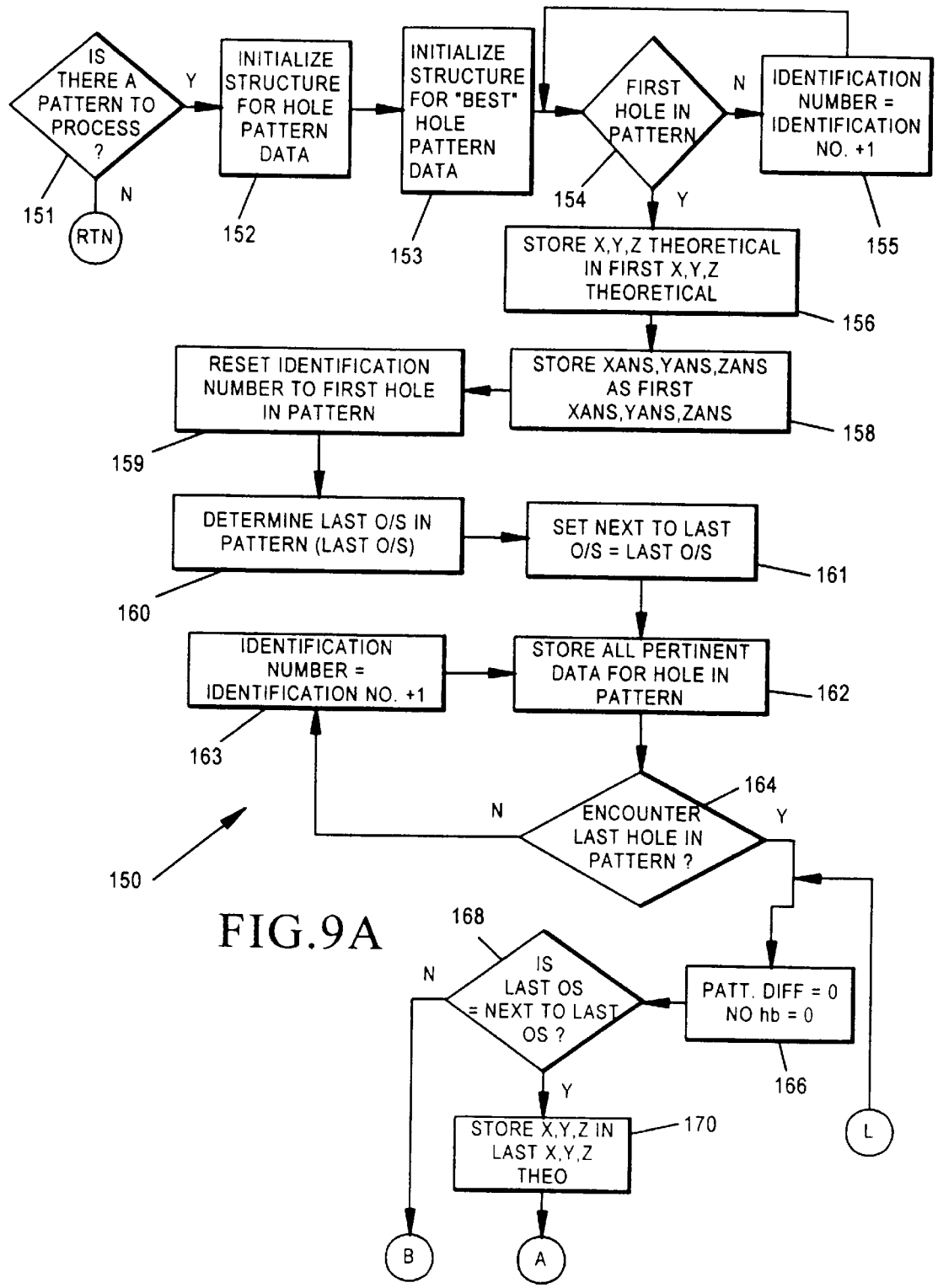
FIGS. 9*a*–9*g* are a flow chart showing a pattern determination subroutine invoked by the main routine.
Figure 9B:
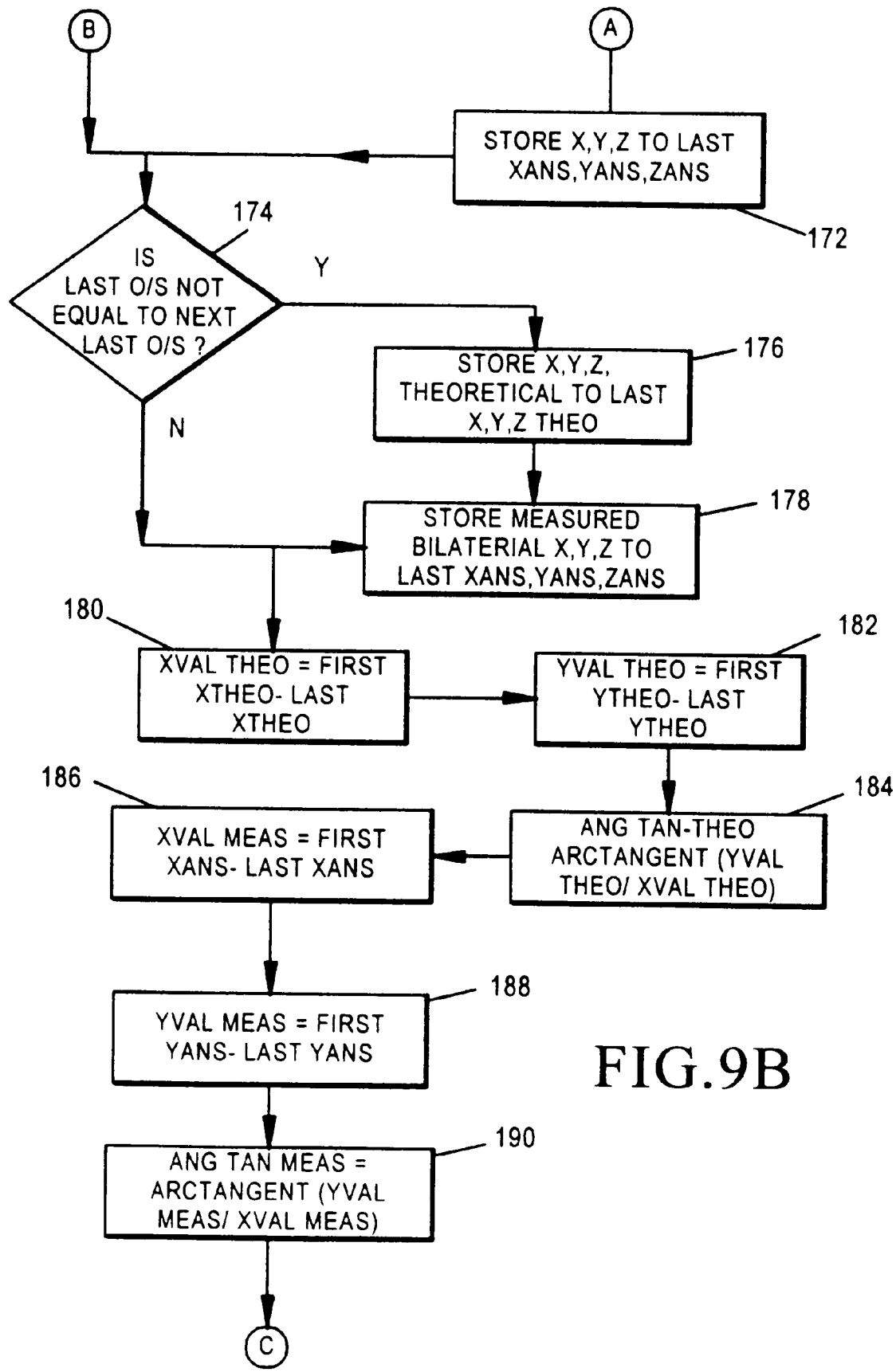
Figure 9C:
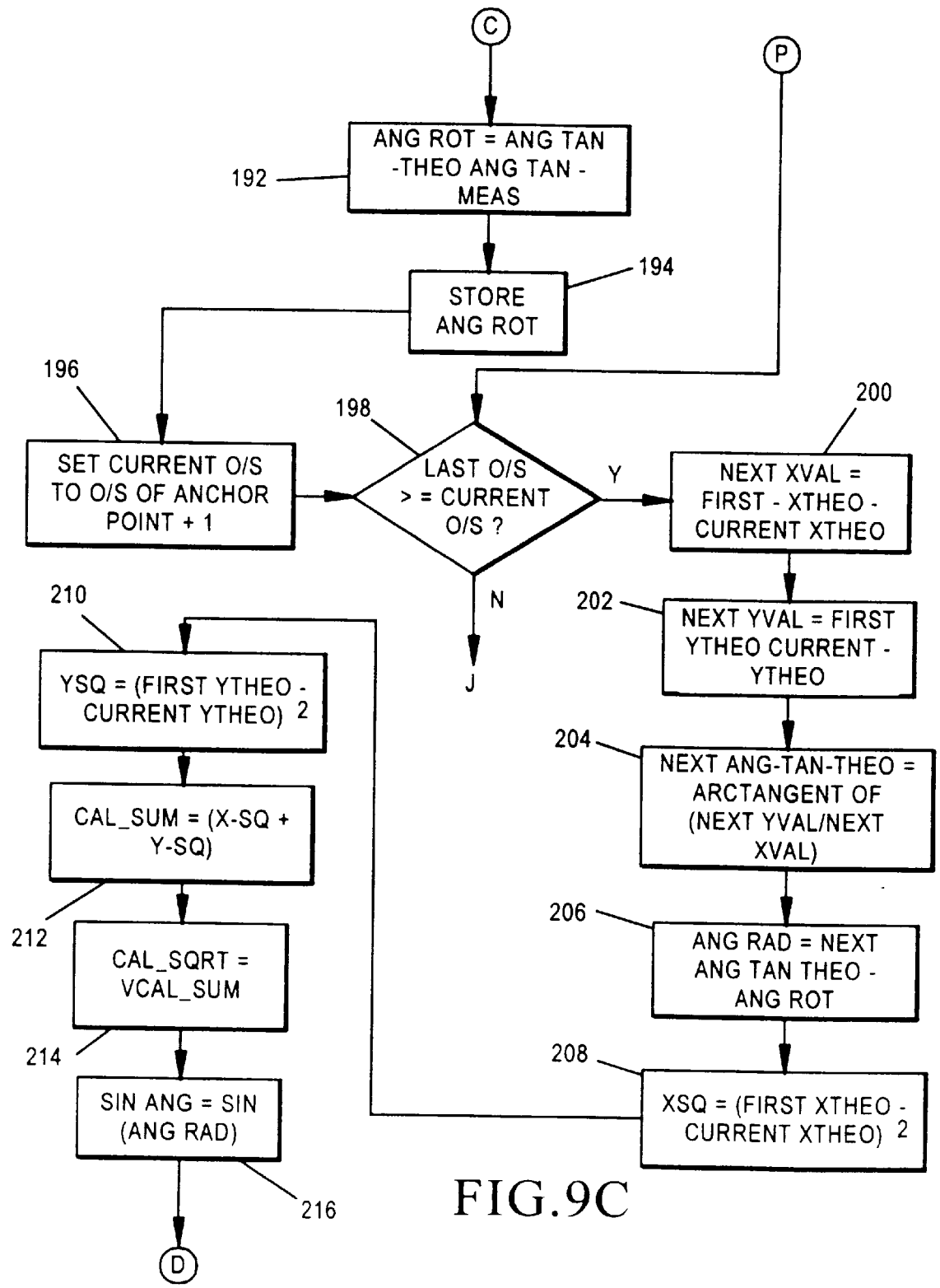
Figure 9D:
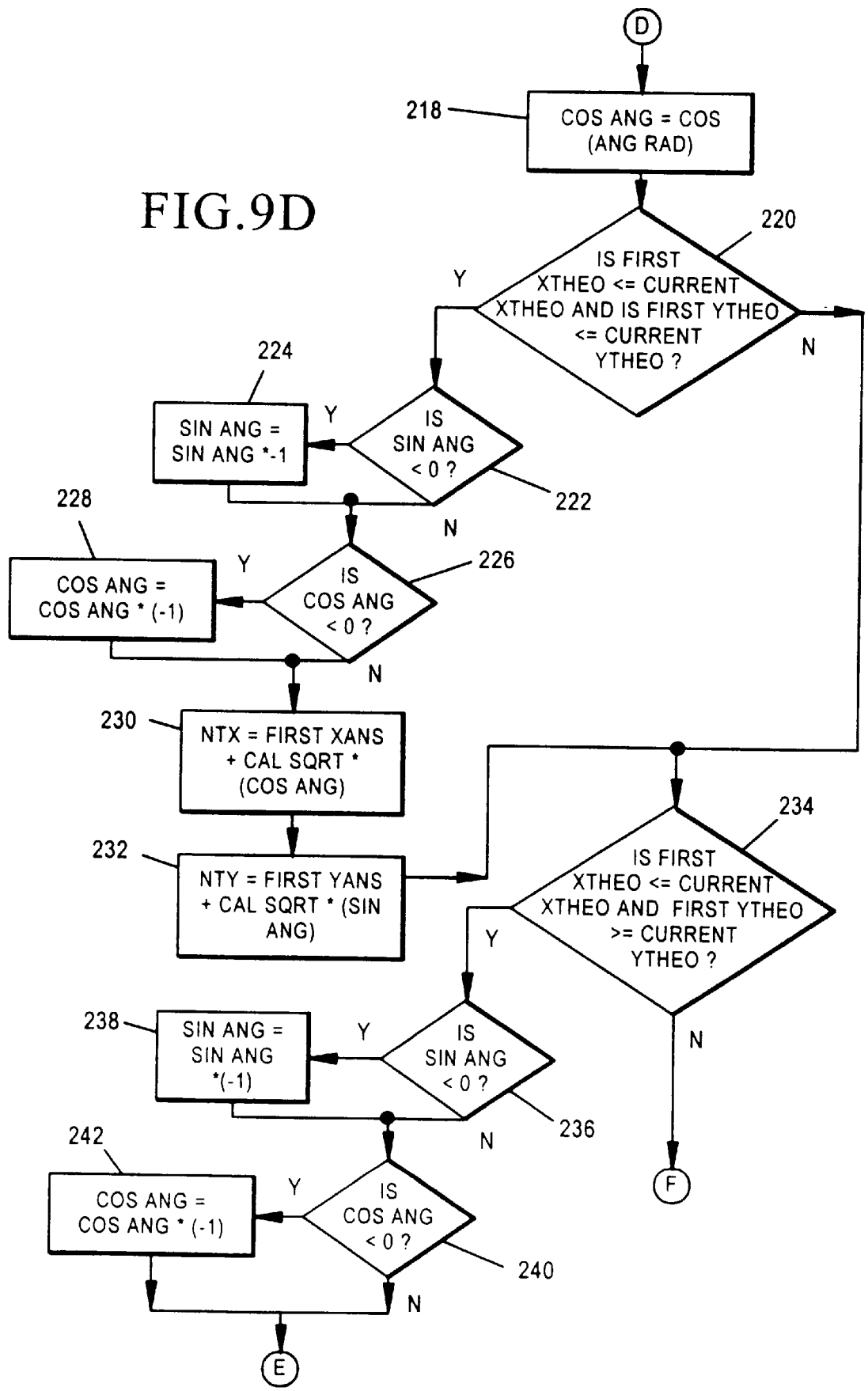
Figure 9E:
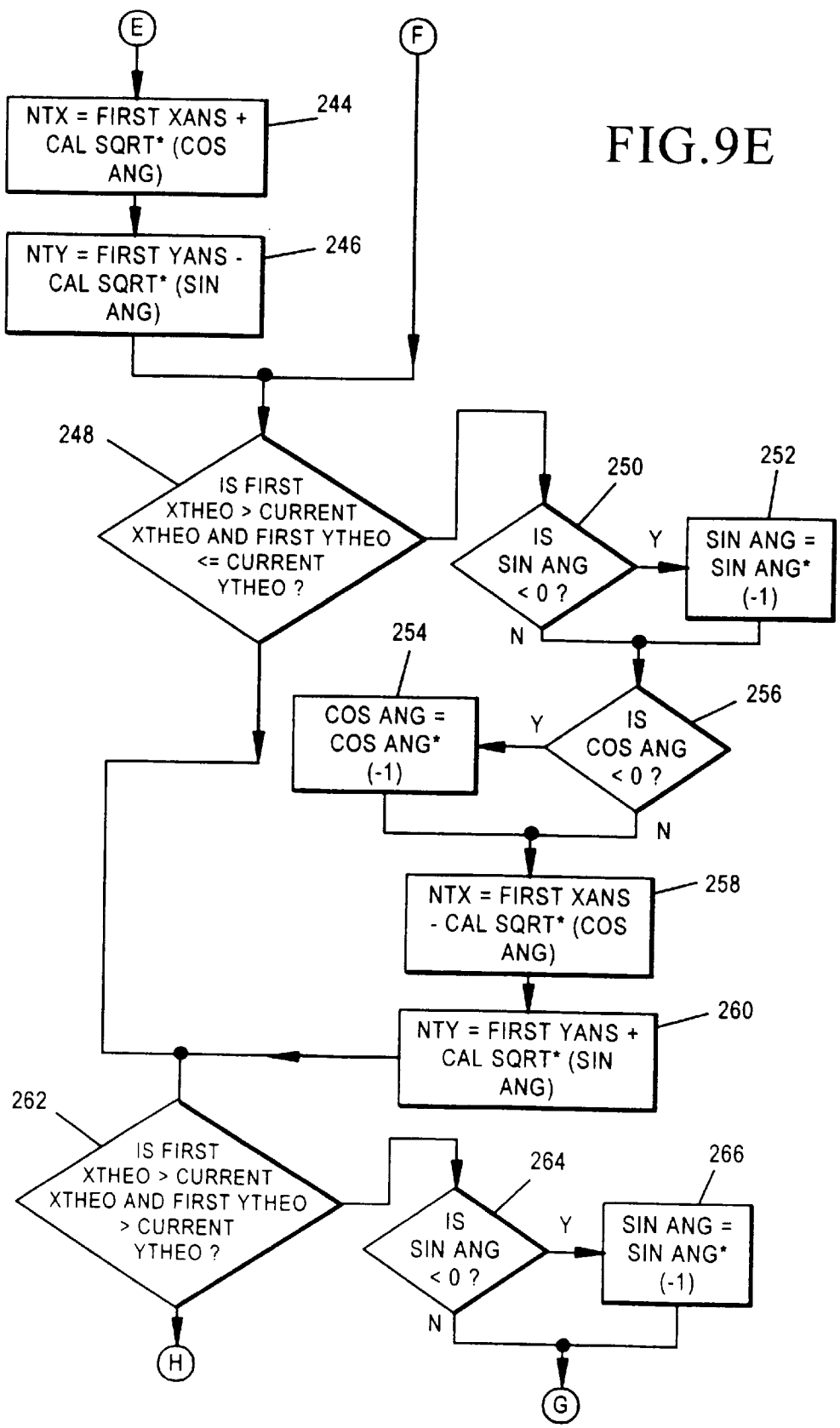
Figure 9F:
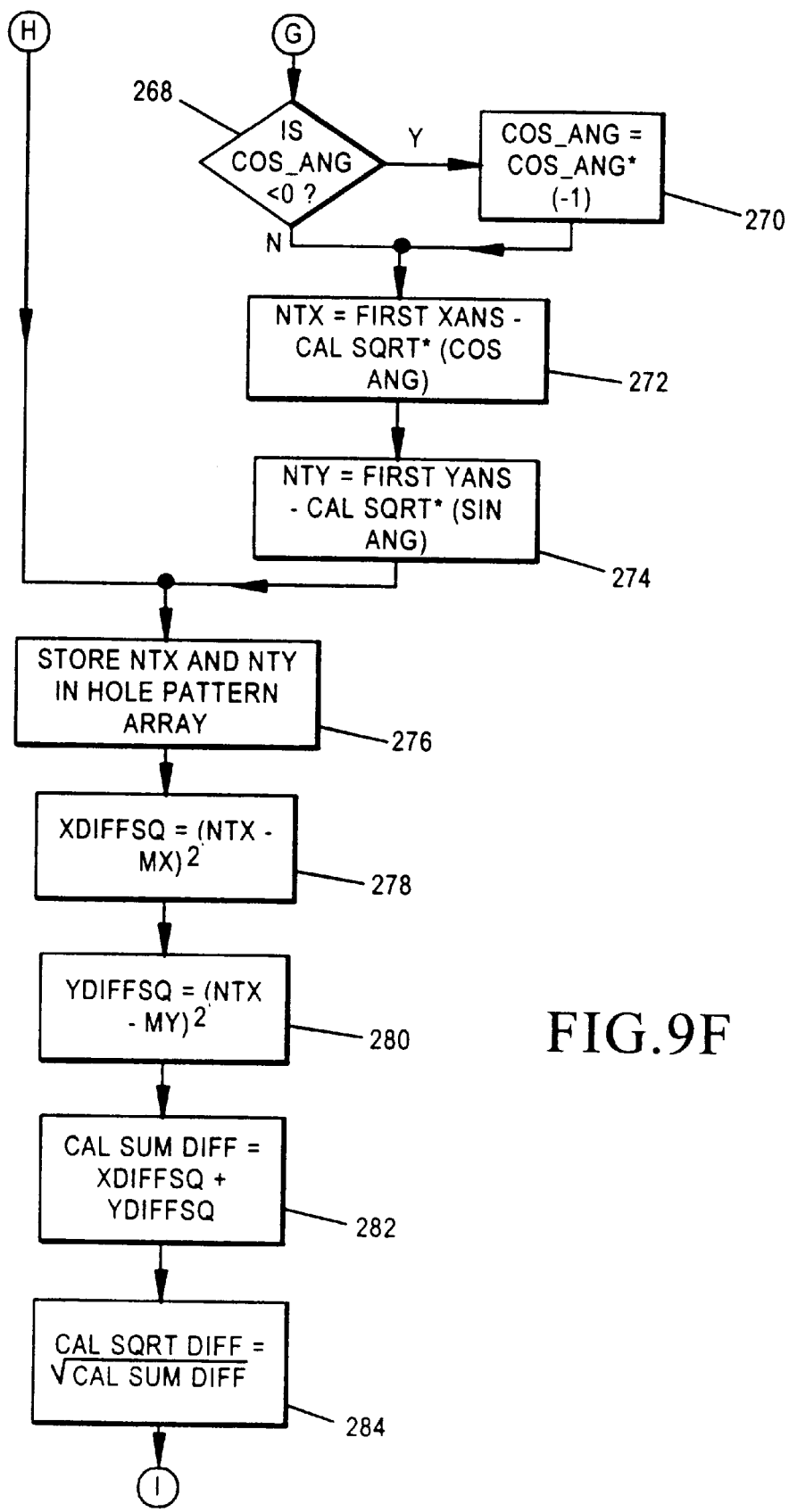
Figure 9G:
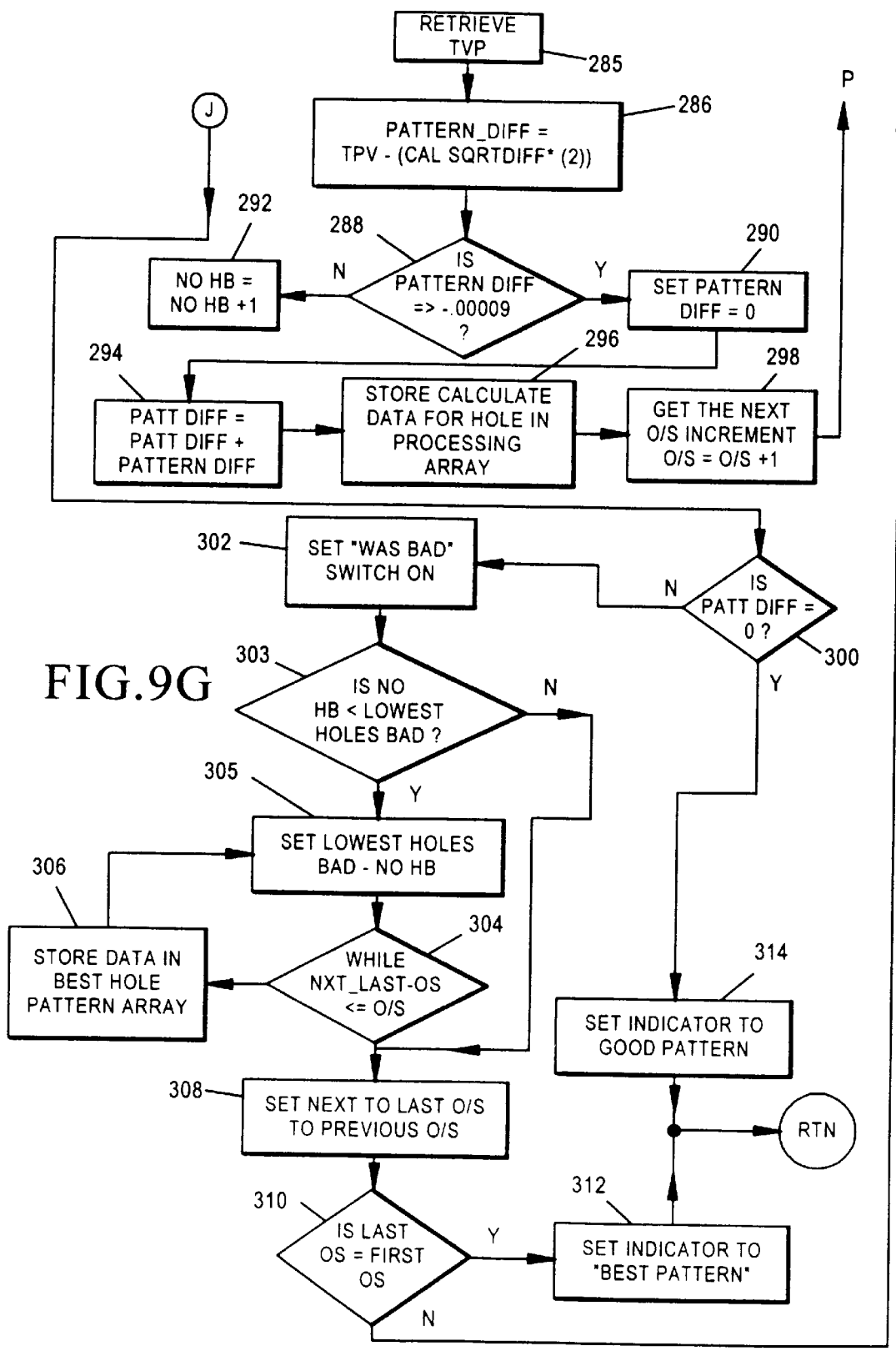

Initially, as shown in FIG. 9a, the CPU 36 begins the pattern comparison routine at step 151, where the CPU 36 reviews the ideal file in the DNC 42 to determine if a flag was set indicating that a pattern existed within the operating sequence run on the component 53, if no pattern is found, then the CPU 36 returns to the main routine 60. However, if a flag is found, the CPU 36 proceeds to step 152, and initializes a hole pattern array that will contain all pertinent data for every feature in the pattern that is located in the ideal file, which is retrieved from the DNC 42, and the measured file from the measured data array 43. The array is stored within a pattern comparison memory 47 of the CPU 43, shown in FIG. 3. In step 153, an array of memory for storing "best hole" pattern data is initialized in memory 47.

Data for features other than those of the pattern may be present in the operating sequence. Therefore, in step 154, the CPU 36 checks each feature in the operating sequence, sequentially. If the feature is not a hole, then the CPU 36 proceeds to step 155. In step 155, the CPU 36 increments the identification number to the next identification number in the sequence, and this next feature in the operating sequence is checked. However, when the beginning of the hole pattern 51 is found, the CPU 36 proceeds to step 156. In step 156, the CPU 36 stores the x, y, and z positional values of the center point of the first hole of the pattern in the ideal file, and identifies them as Xtheo, Ytheo, and Ztheo in a special location in memory 47 as a "theoretical anchor point." Next, in step 158, the CPU 36 stores the x, y, and z positions of the calculated center point of the first hole of the measured data in memory 47, and identifies them respective as Xans, Yans, and Zans, as a "measured anchor point." The theoretical and measured anchor points are the only points that always remain fixed. These points occupy the same position as the remaining theoretical positions are altered in an attempt to determine the best alignment of the theoretical and measured pattern. In step 159, the CPU 36 resets the identification number to the identification number of the first hole in the pattern.

In step 160, the operating sequence identification number of the last hole in the pattern is determined and stored in memory 47. In step 161, a variable identified as Next to Last O/S (operating sequence), is set equal to the identification number determined in step 160 identified as last O/S, the CPU 36 then proceeds to step 162.

In step 162, the CPU 36 stores both the ideal data from the DNC 42, and the measured positional data from the measured data array 43, for the hole corresponding to the current identification number into the hole pattern array. Then, the CPU 36 proceeds to step 164, and checks the current data of each number to see if the last hole in the pattern 52 has been encountered. Here, the current identification number is compared with the identification number stored in step 160. If the hole examined is not the last hole in the pattern, then the CPU 36 proceeds to step 163, and increments the identification number by one, and then returns to step 162. Repeating step 162, the CPU 36 stores data such as the ideal and measured hole center points as well as their acceptable tolerances for the next hole into the hole pattern array. However, once the CPU 36, in step 164, determines that the center point for the last hole in the pattern has been stored in the hole pattern array, then the CPU 36 proceeds to step 166. Thus, the CPU 36 stores only the pertinent data from the features within the pattern and filters out all the other features in the operating sequence. By placing all the pertinent data in both the ideal and measured files of the features of the pattern in the hole pattern array, the data may be easily retained and manipulated.

In step 166, the CPU 36 initializes two variables to zero. The first variable, "PATT.DIFF," is a value equal to the assigned tolerance of the hole subtracted by any deviation between the ideal position of the hole and the measured position of the hole. The second value, no hb (bad holes) indicates the number of holes determined to be out of tolerance for a pattern using a particular choice of alignment between the ideal and measured positions.

The CPU 36 has now gathered all the data it needs to compare the measured pattern with the ideal pattern. However, each hole in the measured pattern will not be in the same position relative to the NC machine axis as the holes of the ideal pattern. To align these two patterns, the ideal pattern is manipulated so that the two patterns are as close as possible in position to one another. To align the patterns, the ideal pattern is rotated about its ideal anchor point until it matches the measured pattern. To calculate how much the angle of rotation should be, the CPU 36 assigns a hole as an orientation hole in both the measured and ideal file. This orientation hole is the last identification number in the operating sequence in the pattern. A vector from the anchor point to the orientation point in both the measured and ideal file are compared, and the angular difference is noted. The ideal pattern is then rotated by the angular difference and compared to the measured pattern. If the position of all holes in the measured pattern and the ideal pattern, as adjusted, are within acceptable tolerance, then the comparison is over. However, if some holes don't match, then a new orientation point is selected. The new orientation point is one identification number less than the previous hole. This continues until the orientation point is the same as the anchor point.

In step 168, the CPU 36 obtains the current positional value of the orientation point. If the current orientation point has the identification number of the last hole in the pattern, then the CPU 36 determines that the current last value in the operating sequence is the initial orientation point, and proceeds to step 170, where it stores the x, y, and z positional values from the ideal file, as Last Xtheo, Last Ytheo, and Last Ztheo in a special memory allocation for the first orientation point in the memory 47. The CPU 36 then proceeds to step 172, where it stores the positional values x, y, and z from the measured file to a special orientation hole memory allocation as Last Xans, Last Yans, and Last Zans. However, if the last operating sequence value had not equaled the next to last value in step 168, then the CPU 36 would have proceeded directly to step 174.

In step 174, the CPU 36 determines if the value for the current orientation point is still the initial value or has changed. If it has not changed, then the CPU 36 proceeds directly to step 180. However, if orientation point has changed, then the CPU 36 proceeds to step 176 and the former values of the variables last Xtheo, last Ytheo, and last Ztheo are replaced with values of the new orientation point. In step 178, the CPU 36 replaces the values in the variables Last Xans, Last Yans, and Last Zans with the measured values of the new orientation hole.

The CPU 36 then proceeds to calculate the distance of the anchor point from the orientation point in the ideal file and the angle the connecting line segment or vector makes with the machine axis. Initially, in step 180, the CPU 36 calculates a distance of travel in the x direction "Xval–theo," where:

$$X_{val-theo} = \text{First } X_{theo} - \text{Last } X_{theo}.$$

Next, in step 182, the CPU 36 calculates a distance of travel in the y direction, "Yval–theo," where:

$$Y_{val-theo} = \text{First } Y_{theo} - \text{Last } Y_{theo}$$

Proceeding to step 184, the CPU 36 calculates an angle the line segment or vector extending from the anchor point to the orientation point makes with the machine axis. Here, the CPU 36 calculates Ang Tan theo, where:

$$\text{Ang Tan theo} = \arctan(Y_{val-theo}/X_{val-theo}).$$

The CPU 36 then proceeds to calculate the distance of the anchor point from the orientation point in the measured file as well as the angle the connecting line segment or vector makes with the machine axis. Initially, in step 186, the CPU 36 calculates a distance of travel in the x direction, as variable Xval meas, where:

$$X_{val\ meas} = \text{First } X_{ans} - \text{Last } X_{ans}.$$

Next, in step 188, the CPU 36 calculates a distance of travel in the y-direction, as variable Yval meas, where:

$$Y_{val\ meas} = \text{First } Y_{ans} - \text{Last } Y_{ans}.$$

Proceeding to step 190, the CPU 36 calculates an angle the line segment or vector extending from the anchor point to the current orientation point in the theoretical file makes with the machine axis. Here, the CPU 36 calculates the Ang Tan meas, where:

$$\text{Ang Tan meas} = \arctan(Y_{val\ meas}/X_{val\ meas}).$$

Once the line segments or vectors for the ideal file the measured file connecting the anchor points to the orientation points have been determined, then the difference between the two angles is calculated to determine the angular offset between the ideal and measured values files. This offset can then be used to create a new ideal file that is corrected for any radial shift between the ideal pattern and the actual measured pattern. The offset determines how much the positions in the ideal pattern need to be rotated to overlay the measured positions. To calculate the offset, the CPU 36, in step 192 calculates Ang Rot, where:

$$\text{Ang Rot} = \text{Ang Tan theo} - \text{Ang Tan meas}.$$

Next, in step 194, the CPU 36 stores the value Ang Rot in a the bole pattern array, where it can be easily recalled.

In step 196, the CPU 36 obtains from the hole pattern array in memory 47 all the pertinent data regarding the first hole in the operating sequence that follows the anchor point for both the ideal file and the measured file, and begins the process of sequentially evaluating each of the holes in the pattern. In step 198, the CPU 36 tests to see from which hole in the operating sequence the data has been loaded. If the current hole being tested is greater than the last identification number in the pattern, then the CPU 36 proceeds to step 300 where it checks to see if the pattern was in tolerance. However, if the CPU 36 determines that the current hole is the orientation point or some other hole between the anchor point and the orientation point, then it proceeds to step 200.

Next, the CPU 36 creates an adjusted ideal file. In the present embodiment each hole in the pattern is sequentially processed. For one hole at a time an adjusted ideal position is calculated, and compared against the measured position to see if it is in tolerance. This process is repeated for every hole in the pattern. Initially, in step 200, the CPU 36 calculates the distance along the X-axis between the anchor point and the center point of the hole currently being evaluated. This value is denoted by Next Xval, and is calculated as follows:

$$\text{Next } X_{val} = \text{First } X_{theo} - \text{current } X_{theo}.$$

In step 202 the CPU 36 determines the distance along the Y-axis between the anchor point and the center point of the hole currently being evaluated. This value is denoted by Next Yval, and is calculated as follows:

$$\text{Next } Y_{val} = \text{First } Y_{theo} - \text{current } Y_{theo}.$$

In step 204, the CPU 36 calculates the angle a vector or line segment extending from the anchor point to the center point of the hole being evaluated makes with the machine axis. This angle is denoted Next Ang tan theo, and is calculated as follows:

$$\text{Next Ang tan theo} = \arctan(\text{Next } Y_{val}/\text{Next } X_{val}).$$

The CPU 36 then adjusts the angle of the anchor point to the centerpoint of the hole being evaluated relative to the machine axis to compensate for the angular offset between the measured file and the ideal file. A new angular value denoted ANG RAD is calculated as follows:

$$\text{ANG RAD} = \text{Next Ang tan theo} - \text{Ang Rot}.$$

The CPU 36 then determines the distance or magnitude of the vector between the anchor point and the center point of the hole being evaluated in the ideal file. In steps 208 and 210 the CPU 36 squares the respective distances along the X and Y axes from the anchor point to the center point of the hole under examination as follows:

$$X_{sq}=(\text{First } X_{theo}-\text{Current } X_{theo})^2=(\text{Next } X_{val})^2$$

$$Y_{sq}=(\text{First } Y_{theo}-\text{Current } Y_{theo})^2=(\text{Next } Y_{val})^2.$$

In step 212, the CPU 36 sums these two values, and then calculates the square root in step 214 which is stored as the variable CAL SQRT. The value CAL SQRT is the distance between the anchor point and the centerpoint of the hole being calculated. The CPU 36, in step 216, then calculates the sine of the adjusted angle and stores it in memory, where:

SIN ANG=sin (ANG RAD).

Similarly, in step 218, the CPU 36 calculates the cosine of the adjusted angle and stores the value in memory as COS ANG, where:

COS ANG=cos (ANG RAD).

Once the CPU 36 has calculated the cosine and sine of the corrected angle for the hole under evaluation, it calculates a new ideal X and Y position of the centerpoint for the hole. The new ideal positions are calculated using CAL SQRT, the distance between the anchor point and the hole being evaluated, as well as the adjusted angular variables COS ANG, and SIN ANG. The new adjusted ideal value of X begins at the measured anchor point First Xans and the new adjusted ideal value of Y begins at First Yans. Then the adjusted distance of X and Y from the anchor points is calculated from CAL SQRT using COS ANG and SIN ANG, respectfully. By making the new position of the ideal anchor point equal to the position of the measured anchor point, there is no need for any transverse offset between the new ideal values and the measured values. This can be thought of as designating the anchor point as always overlapping on both patterns and then rotating the ideal positions around the anchor point until the best overlap is determined.

To calculate the new X and Y adjusted values, the distances along the $X_{axis}$ and the Yaxis from the anchor point may have to be added or subtracted depending on the relative positions of the hole being evaluated to the anchor point. The CPU 36 performs these calculations as follows. Initially, a series of steps are taken to ensure that the value of the sine and cosine of the angles of the vectors used to calculate the new values are all positive. For example, in step 220, the CPU 36 compares the value of the First X theo with the current Xtheo and the First Ytheo with the current Ytheo. If the condition that the First Xtheo and First Ytheo are respectively less than or equal to the current values of Xtheo and Ytheo is not met, then the CPU 36 proceeds to step 234. However, if the conditions are met, then the CPU 36 proceeds to step 222.

In step 222, the CPU 36 checks to see if the SIN ANG is less than zero, if it is, then the CPU 36 proceeds to step 224, where the current value is multiplied by −1 to make it positive. However, if the SIN ANG is not negative, then the CPU 36 proceeds to step 226, where it then checks if the value of COS ANG is less than zero. If COS ANG is negative, then the CPU 36 proceeds to step 228, and multiplies the value by −1 to make it positive and then proceeds to step 230. However, if in step 226, the CPU 36 determines that the value of COS ANG is positive, then it proceeds directly to step 230. In step 230, the CPU 36 calculates the new value of x, ntx, for the adjusted ideal file, which has been compensated for by the angular offset. The value of ntx is calculated as follows:

ntx=First $X_{ans}$+CAL SQRT*(COS ANG).

The CPU 36 then proceeds to step 232, where it calculates a new value of y, nty, for the adjusted ideal file. The value of nty is calculated as follows:

nty=First $Y_{ans}$+CAL SQRT*(SIN ANG).

Proceeding to step 234, the CPU 36 compares the values of First Xtheo and the First Ytheo respectively with the current Xtheo and the values of the current Ytheo. In this comparison, the CPU 36 checks to see if the conditions that Xtheo is less than or equal to the current Xtheo and that the First Ytheo is greater than the current Ytheo is met. If the conditions are not met, the CPU 36 proceeds to step 248. However, if the values meet these conditions, then the CPU 36 proceeds to steps 236 through 242, which adjust the signs of the sine and cosine values to ensure that they are all positive. Initially, in step 236, the CPU 36 checks to see if the value SIN ANG is less than or equal to zero, if it is, then the CPU 36 branch to step 238, where it multiplies the value SIN ANG by −1 to make the value positive. However, if the value is not less than zero, then the CPU 36 proceeds directly to step 240. In step 240, the CPU 36 checks if the value of the COS ANG is less than zero, and if it is, the CPU 36 proceeds to step 242, where it multiplies the value by −1 to make it positive and then proceeds to step 244. However, if the CPU 36 determines that the value of the COS ANG is positive, then the CPU 36 proceeds directly to step 244.

In step 244, the CPU 36 calculates the new value of x, ntx, for the adjusted ideal file, which has been compensated for by the angular offset. The value of ntx is calculated as follows:

ntx=First $X_{ans}$+CAL SQRT*(COS ANG).

The CPU 36 then proceeds to step 246, where it calculates a new value of y, nty, for the adjusted ideal file. The value of nty is calculated as follows:

nty=First $Y_{ans}$−CAL SQRT*(SIN ANG).

Proceeding to step 248, the CPU 36 compares the values of First Xtheo and the First Ytheo respectively with the current Xtheo and the current Ytheo. In this comparison, the CPU 36 checks to see if the condition that Xtheo is greater than the current Xtheo and that the First Y theo is less than or equal to the current Ytheo is met. If the conditions are not met, then the CPU 36 proceeds to step 262. However, if the values meet these conditions, then the CPU 36 proceeds to steps 250 through 256, which adjust the signs of the sine and cosine values to ensure that they are all positive. Initially, in step 250, the CPU 36 checks to see if the value SIN ANG is less than or equal to zero, if it is, then the CPU 36 branches to step 252, where the CPU 36 multiplies the value by −1 to make the value positive. However, if the value is not less than zero, then the CPU 36 proceeds directly to step 254. In step 254, the CPU 36 checks if the value of the value COS ANG is less than zero, and if it is, then the CPU 36 proceeds to step 256, where it multiplies the value by −1 to make it positive and then proceeds to step 258. However, if in step 254, the CPU 36 determines that the value COS ANG is positive, it proceeds directly to step 258. In step 258, the CPU 36 calculates the new value of x, ntx, for the adjusted ideal file, which has been compensated for by the offset. The value of ntx is calculated as follows:

ntx=First $X_{ans}$−CAL SQRT*(COS ANG).

The CPU 36 then proceeds to step 260, where it calculates a new value of y, nty, for the adjusted ideal file. The value of nty is calculated as follows:

$$nty = \text{First } Y_{ans} + \text{CAL SQRT}^*(\text{SIN ANG}).$$

The CPU 36 then proceeds to step 262. In step 262, the CPU 36 compares the values of the First Xtheo and the First Ytheo respectively with the current Xtheo and the current Ytheo. In this comparison, the CPU 36 checks if the condition that Xtheo is greater than the current Xtheo and that the First Y theo is greater than the current Ytheo is met. If the conditions are not met, then the CPU 36 proceeds to step 276. However, if the values meet these conditions, then the CPU 36 proceeds to steps 264 through 270, which adjust the signs of the sine and cosine values to ensure that they are all positive. Initially, in step 264, the CPU 36 checks to see if the value SIN ANG is less than or equal to zero, if it is, then the CPU 36 branches to step 266, where the CPU 36 multiplies the value SIN ANG by −1 to make the value positive. However, if the value is not less than zero, the CPU 36 proceeds directly to step 268. In step 268, the CPU 36 checks if the value of the COS ANG is less than zero, and if it is, the CPU 36 proceeds to step 270, where it multiplies the value by −1 to make it positive and then proceeds to step 272. However, if the CPU 36 determines that the value COS ANG is positive, then it proceeds directly to step 272. In step 272, the CPU 36 calculates the new value of x, ntx, for the adjusted ideal file, which has been compensated for by the angular offset. The value of ntx is calculated as follows:

$$ntx = \text{First } X_{ans} - \text{CAL SQRT}^*(\text{COS ANG}).$$

The CPU 36 then proceeds to step 274, where it calculates a new value of y, nty, for the adjusted ideal file. The value of nty is calculated as follows:

$$nty = \text{First } Y_{ans} - \text{CAL SQRT}^*(\text{SIN ANG}).$$

Next, in step 276, the CPU 36 stores the values of ntx and nty in the hole pattern array located in memory 47, and associates the data with its particular hole in the pattern. The new adjusted ideal values are then compared to the measured value of the hole to determine if the measured hole is within tolerance. This is done by subtracting the measured value of the distance between the anchor point and the centerpoint of the hole being examined by a new compensated ideal distance between the anchor and the present hole derived from the adjusted ideal values.

Initially, in step 278, the CPU 36 calculates the difference between the new ideal value of x, ntx, for the particular hole and the measured distance to obtain the value X diffsq, as follows:

$$X \text{ diffsq} = (ntx - mx)^2.$$

Next, in step 280, the CPU 36 squares the difference between the new ideal value of Y and the measured distance along the Yaxis to the centerpoint of the particular hole as calculated from the measured data points to obtain the value Y diffsq, as follows:

$$Y \text{ diffsq} = (nty - my)^2.$$

In step 282, the CPU 36 sums X diffsq and Y diffsq to obtain the value CAL SUM diff. Then, in step 284, the CPU 36 calculates the square root of the value CAL SUM diff to obtain the value CAL SQRT diff.

In step 285, the tolerance for the particular hole is retrieved from the hole pattern array, and assigned the variable TPV (tolerance pattern value). In step 286, this variable is then subtracted by twice the value CAL SQRT diff, to yield a Pattern Diff, where:

$$\text{Pattern Diff} = \text{TVP} - \text{CAL SQRT diff}^*(2).$$

Pattern Diff is the actual amount that the current hole is out of tolerance. Thus, the differences between the new ideal position of the current hole and the measured position are found on both the X axis and the Y axis, then these values are converted to polar coordinates to determine the magnitude of a vector that this difference would produce. Since the magnitude represented by CAL SQRT diff could fall along the radius of the hole in the opposite direction of the centerpoint the value is multiplied by two (2) before being subtracted from the tolerance pattern value TVP.

The resulting comparison between the difference of the hole as measured and its adjusted ideal is then checked by the CPU 36 in step 288. The CPU 36 determines if the value of Pattem Diffis greater than or equal to (−0.00009). The variation of 0.00009 is the amount of acceptable measurement error with most NC devices. If the CPU 36 determines the value of Pattern Diff is greater than or equal to −0.00009, then the current hole is considered to be within tolerance, and is a "good hole," and the CPU 36 sets the value of Pattern Diff equal to zero in step 290. However, if the CPU 36 determines that pattern diff is not greater than or equal to (−0.00009), then the hole is not within acceptable tolerance, and it is considered a "bad hole." When the CPU 36 considers the current hole to be bad, it then proceeds to step 292.

In step 292, the CPU 36 increments the bad hole counter (no hb) by one. Next, in step 294, the value PATT DIFF, which was originally initialized in step 166, is recalculated by adding the previous values of PATT DIFF to the current value of pattern difference as follows:

$$\text{PATT DIEFF} = \text{PATT DIFF} + \text{Pattern Diff}.$$

Thus, the final value of PATT DIFF will be the cumulative value of all out of tolerance amounts for the holes in the pattern. In step 296, the CPU 36 stores the data for the current hole in a processing array set up in memory 47. The processing array stores all the calculated hole data including the deviation from acceptable tolerances. After storing the data, the current identification number in the operating sequence is incremented by the CPU 36 in step 298, and the CPU 36 then returns to step 198, which again checks to see if the current value of the operating sequence, as now incremented, is greater than the last value of the operating sequence within the pattern. If it is not, the CPU 36 proceeds to step 200, and the process is repeated as described above. However, if the CPU 36 determines that the value is larger, then it concludes that every hole in the pattern has been evaluated, and the CPU 36 proceeds lo step 300.

In step 300, the CPU 36 inspects the current value of the variable PATT DIFF to see if the current hole pattern as calculated, using a designated orientation hole, has any holes that are out of tolerance. If PATT DIFF is equal to zero, then every hole in the pattern, as measured and compared to the ideal file using the alignment indicated by a particular orientation hole, is good, and the CPU 36 proceeds directly to step 314 which sets an indicator to "good pattern." Then the CPU 36 returns to step 80 of the main routine 60, shown in FIG. 4, and proceeds to step 82. In step 82, the system processor 21 prints out the results of the comparison as well as indicting that all holes in the pattern are within tolerance. The system processor 21 then discontinues it determination of patterns in the operating sequence, or searches for another pattern in the operating sequence. However, if in step 300, the CPU 36 determines that the value of PATT DIFF is not equal to zero, then the CPU 36 determines that the pattern was bad, i.e., the pattern contained at least one bad out of tolerance hole, and proceeds to step 302. In step 302, the CPU 36 sets a flag in a designated location of memory 47 indicating that the current hole pattern is bad. The CPU 36 then proceeds to step 303.

In step 303, the CPU 36 checks to see if the current alignment of the ideal and measured pattern yields fewer bad holes than any previous alignment. If the current pattern has fewer bad holes, then the CPU 36 proceeds to step 305 and sets the lowest number of bad holes equal to the number of bad holes (no hb) in the closer alignment. In step 304, the CPU 36 isolates a hole in the processing array formed by the CPU 36 at step 296, and then in step 306, it stores the data into the "best hole" pattern array, which was initialized by the CPU 36 in step 153. This storage process is repeated for each hole in the pattern until the best hole pattern array has been completed. The CPU 36, then proceeds to step 308. However, if the CPU 36 determines in step 303 that the present alignment of the ideal and measured pattern does not yield fewer bad holes than an alignment that proceeded it, then the CPU 36 proceeds directly to step 308, where the CPU 36 decrements the value of the orientation hole to the next lowest value in the operating sequence.

The CPU 36 then proceeds to step 310, where it checks to see if the newly designated orientation point is the same value as the anchor point. If it is not, then the CPU 36 proceeds to step 166 and begins the above described sequence of steps to evaluate the pattern using new offset values. However, if the CPU 36 in step 310 finds that the newly chosen orientation point is the anchor point, then it stops checking for new offsets since all the different variations have been checked.

If at least one hole in a pattern is considered to be out of tolerance, then the total number of bad holes found is compared with all previous patterns resulting from a different choice of offsets. This process is repeated until an alignment that yields a pattern where all holes are in alignment is found, or until all holes except the anchor have been used as an orientation hole. Once all combinations of offsets have been attempted, the pattern remaining in the "best hole" pattern array will be the pattern having the best match between the hole pattern in the ideal file and the measured pattern.

In step 312, the CPU 36 sets an indicator to a "best Pattern report," and returns to step 80 in the main routine 60, shown in FIG. 4. The system processor 21 retrieves the best pattern array and proceeds to step 82 where it prints out the data regarding the bad hole pattern.

The above features provide a system that allows an NC device to carry out tolerance measurements on a composite pattern it has just machined without the need to transfer the component to a device specializing in tolerance measurement such as a CMM. Further, the system is capable of measuring a component once and then reprocessing that data until it determines an offset that yields an in tolerance pattern or a pattern with the least number of out of tolerance holes. The process eliminates the need to re-measure the entire component if the first attempt to match the measured features of the component and their ideal pattern counterparts fail. This speeds up the process used to determine if the pattern is in tolerance. Thus, the present invention provides an accurate and time saving measuring device.

Except as otherwise disclosed herein, the various components shown in outline or block form are individually well know and their internal construction and their operation is not critical either to the making or the using of this invention.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-described embodiments may be made without departing from the spirit and scope of the invention. Therefore, the invention is to be limited only by the following claims.

What is claimed is:

1. A probing system for checking a pattern formed by a plurality of features of an object, said system comprising:

an input device that receives an ideal position and an ideal set of dimensions of each of the plurality of features, as well as an acceptable tolerance for the plurality of features, said input device generating a first signal indicative of an amount of samples and an ideal location as well as the acceptable tolerance of each of the samples for the plurality of features;

a probe device having a probe, said probe device being electrically connected to said input device to receive the first signal from said input device, and in response, directing said probe to the location of each of the samples, said probe device outputting a second signal indicative of a measured location of each of the samples; and a processor having a memory, said processor electrically connected to said probe device and said input device, said processor performing the operations of:

receiving and storing in said memory the first signal indicative of the ideal location and the acceptable tolerance of each of the samples for the plurality of features;

receiving and storing in said memory the second signal indicative of the measured location of each of the samples from said probe device;

calculating a measured position of each of the plurality of features forming the pattern based on the measured location of each of the samples;

selecting an ideal anchor point from the ideal position of one of the plurality of features;

selecting a measured anchor point from a respective one of the measured position of the plurality of features;

selecting an ideal orientation point from the ideal position of one of the plurality of features;

selecting a measured orientation point from a respective one of the measured position of the plurality of features;

calculating an angular variation between the measured position and the ideal position of each of the plurality of features by taking the angular difference of a line segment connecting the ideal anchor point and the ideal orientation point and a line segment connecting the respective measured anchor point and the measured orientation point;

offsetting the stored ideal position of each of the plurality of features by the angular variation to create a new set of data representing an adjusted ideal position for each of the plurality of features;

comparing said measured position of each of the plurality of features with the respective adjusted ideal position of each of the plurality of features;

determining whether the measured position of each of the plurality of features forming the pattern falls within the acceptable tolerance of the respective adjusted position of each of the plurality of features; and recalculating the angular variation by selecting a new ideal orientation point and a respective new measured orientation point until said processor determines that the measured position of each of the plurality of features falls within the acceptable tolerance of each of the respective adjusted ideal position of each of the plurality of features.

2. The probing system according to claim 1, wherein said processor further performs the operations of:

counting an amount of the measured position of each of said plurality of features that were not within acceptable tolerance of the respective adjusted ideal position of each of the plurality of features; and storing the amount along with the measured position of each of the plurality of features in said memory.

3. The probing system according to claim 2, wherein in said operation of recalculating the angular variation, said processor further performs the operations of:

reselecting the new ideal orientation point and the new measured orientation point from the ideal and measured position of another of the plurality of features, respectively;

repeating the steps of offsetting the stored ideal position of each of the plurality of features, comparing the measured position of each of the plurality of features, determining whether the measured position of each of the plurality of features falls within acceptable tolerance; and continuing to repeat the above steps until either each of the measured position of the plurality of features is determined to be within tolerance or each of the measured and ideal position of the plurality of features, except the anchor point, has been selected as the orientation point.

4. The probing system according to claim 3, wherein the operation of offsetting the stored ideal position includes the operations of:

substituting a value of the ideal anchor point with a value of the measured anchor point to obtain an adjusted anchor point;

calculating a distance and an angle of the ideal position of the plurality of features from the ideal anchor point; and recalculating the distance and the angle accounting for the angular difference of the line segment connecting the ideal anchor point and the ideal orientation point and the line segment connecting the respective measured anchor point and orientation point; and adding the recalculated distance at the recalculated angle for each of the plurality of features to the adjusted anchor point to determine the adjusted position of each of the plurality of each of the features.

5. The probing system according to claim 4, wherein the operation of determining whether the measured position of each of the plurality of features falls within the acceptable tolerance comprises the operations of:

subtracting the adjusted ideal position of each of the plurality of features from the respective measured position of each of the plurality of features to determine misalignment of the measured positions; and comparing the misalignment of the measured positions of each of the plurality of features with the acceptable tolerance.

6. The probing system according to claim 1, wherein said input device includes:

a computer aided design system that receives the ideal set of dimensions, and converts them to a series of high level instructions; and a post processor in communication with said computer aided design system that converts the series of high level instructions to the first signal indicative of the amount of samples and the location of the sample for the plurality of features.

7. The probing system according to claim 1, wherein said probing device includes a numerically controlled device having a machine control unit that controls the directing of the probe to the location of each of the samples and outputs the second signal indicative of the measured locations of the samples.

8. The probing system according to claim 7, wherein said numerically controlled device further includes a plurality of encoders that report the measured locations to the machine control unit when the probe contacts said object while moving to the location of each of the samples.

9. The probing system according to claim 8, wherein said numerically controlled device performs machining operations on said object.

10. The probing system according to claim 9, wherein said numerically controlled device performs drilling on said object.

11. The probing system according to claim 1, further including a display monitor in communication with said processor for displaying the set of dimensions of the plurality of features and the results of the comparison between the measured position and the ideal position of each of the plurality of features.

12. A method of determining whether a pattern having a plurality of features is within an acceptable tolerance, said method comprising the steps of:

inputting an ideal position for each of the plurality of features;

storing the ideal position for each of the plurality of features;

measuring a position of each of the plurality of features;

storing said measured position of each of the plurality of features forming the pattern;

calculating an angle of variation between said measured position and the ideal position of each of the features by taking the angular difference between a line segment connecting the ideal position of two of the plurality of features and a line segment connecting the respective measured position of the plurality of features;

offsetting said stored ideal position of each of the plurality of features by the angle of variation to create a new set of data representing an adjusted ideal position of each of the plurality of features;

comparing said stored measured position of each of the plurality of features with said respective adjusted ideal position of each of the plurality of features; and determining whether said stored measured position of each of the plurality of features falls within the acceptable tolerance of each of the respective adjusted ideal position of each of the plurality of features and recording when said measured position falls outside of the acceptable tolerance.

13. The method according to claim 12, further comprising the steps of:

counting the number of features determined not to be within an acceptable tolerance; and calculating a new angle of variation until a least number of the features that are not within the acceptable tolerance has been determined.

14. The method according to claim 13, wherein the step of calculating the new angle of variation includes altering the choice of one of the two ideal positions and measured positions forming the line segments to another ideal and measured position of one of the plurality of features, respectively.

15. A method of machining a desired pattern into a component and then probing the component to determine if the machined pattern on the component is within an acceptable tolerance of the desired pattern using an NC machining system having an input device, machining attachments, a probing device and a processor, said method comprising the steps of:

inputting an ideal position and dimensions of each of a plurality of features of the desired pattern into the input device;

machining each of the plurality of features into the component with the machining attachments in accordance with the position and dimensions of each of the plurality of features to form the desired pattern;

probing each of the plurality of features machined into the component to acquire a measured position of each of the plurality of features forming the machined pattern on the component;

storing the measured position of each of the plurality of features forming the machined pattern;

aligning the ideal position of each of the plurality of features of the desired pattern with the stored measured position of each of the plurality of features of the machined pattern to form an aligned ideal pattern; and comparing the machined pattern and the aligned ideal pattern to determine if the machined pattern is within the acceptable tolerance.

16. A pattern measurement method for comparing a measured pattern with an ideal pattern that includes a position of a plurality of ideal features stored within a memory array to determine if the measured pattern is within an acceptable tolerance, said method including the steps of:

detecting the existence of the measured pattern within a plurality of measured features;

storing a position of each of the measured features forming the measured pattern in the memory array;

calculating an angular difference between a measured vector defined by the position of two of the measured features and an ideal vector defined by the position of two features of the plurality of ideal features that correspond to the two measured features;

shifting the position of each of the plurality of ideal features forming the ideal pattern such that a position of a selected one of the measured features overlaps the position of a corresponding one of the plurality of ideal features;

rotating the position of each of the plurality of shifted ideal features forming the ideal pattern about the position of the selected one of the ideal features by the angular difference to a new position;

comparing the position of each of the measured features with the new position of a corresponding one of the plurality of shifted and rotated ideal features; and flagging the measured features that have a position that deviates from the new position of the corresponding shifted and rotated ideal features by more than a specified tolerance.

17. The method according to claim 16 of further comprising the steps of:

recalculating the angular difference by redefining the measured vector by substituting the position of one of the two measured features of the measured vector with the position of another one of the measured features and by redefining the ideal vector by changing a corresponding one of the two ideal features; and repeating said step of recalculating the angular difference until every one of the measured features have been used to define the measured vector, or the angular difference provides the new position of the plurality of ideal features that, when compared with the corresponding measured features, are within tolerance.

18. A method for using an NC device equipped with a probe and a central processing unit having a memory to determine whether each hole in a pattern of holes in a workpiece is within a specified tolerance; said method comprising the steps of:

measuring a plurality of holes in the workpiece with the probe to determine a centerpoint of each of the plurality of holes;

detecting at least one of the pattern of holes in the workpiece;

storing a set of data in the memory consisting of the measured centerpoint location of each of the holes within the pattern of holes that was identified in said step of detecting at least one of the pattern of the holes in the workpiece;

storing a set of data in the memory consisting of a desired ideal centerpoint location of each of the holes within the pattern of holes in the workpiece that was identified in said step of detecting at least one of the pattern of holes in the workpiece;

processing the set of data that includes the desired ideal centerpoint location of each hole in the pattern stored in the memory to form an adjusted set of data that includes adjusted ideal centerpoint locations for each hole in the desired pattern, and retains the same relative relationship of each hole as in the desired ideal pattern, yet is numerically offset to match the measured centerpoint location of each of the holes in the pattern of holes stored in the memory; and comparing the measured centerpoint of each of the holes in the pattern with the adjusted ideal centerpoint locations to determine if all the measured holes with the pattern are within the specified tolerance.

19. The method according to claim 18 wherein said step of measuring a plurality of holes further comprises:

inputting to the CPU a position of each of the plurality of holes in the workpiece and a plurality of data points for each of the plurality of holes to direct the probe to multiple locations along the edge of each of the plurality of holes and registering the position of the probe for each of the data points; and calculating the centerpoint of each of the plurality of holes based on the registered position of the data points.

20. The method according to claim 19 wherein said step of detecting at least one pattern of holes in the workpiece includes detecting a flag during said step of inputting to the CPU a position of each of the plurality of holes, said flag indicating that the pattern is about to begin, and how many consecutive holes will be included within the pattern.

21. The method according to claim 20 wherein said step of processing the set of data includes the steps of translating the values of each ideal centerpoint location of the pattern so one anchor ideal centerpoint location overlaps a corresponding measured centerpoint location; and rotating the numerical values of the ideal centerpoint of each hole in the pattern of holes by a predetermined angle about the anchor ideal centerpoint location to an adjusted centerpoint location.

22. The method according to claim 21 wherein said step of rotating the numerical values includes the step of determining the predetermined angle as the angular difference between a vector formed between the anchor point and a selected measured centerpoint location and the anchor point and a selected ideal centerpoint location.

23. The method according to claim 22 wherein said step of rotating the numerical values of the ideal centerpoint of each of the holes in the pattern about the anchor ideal centerpoint is repeated until each adjusted centerpoint is within the tolerance of a corresponding measured centerpoint or every measured centerpoint has been chosen as the selected one of the plurality of measured centerpoints in the steps of determining the predetermined angle.

24. A method of determining whether a measured pattern of features is within a specified tolerance of a desired ideal pattern of the features, said method including the steps of:
   storing a position of measured features that form the measured pattern in a memory array;
   storing a position of ideal features that form the ideal pattern in the memory array;
   shifting the position of the ideal pattern of features in the memory array numerically, such that the position of a designated one of the ideal features overlaps the position of a corresponding one of the measured features;
   calculating an angular difference between an ideal vector between the designated one of the ideal features and another ideal feature and a measured vector between measured features corresponding to the designated one of the ideal features and the another ideal feature;
   rotating the position of the shifted ideal pattern of features numerically by the angular difference to yield an adjusted pattern of features; and
   comparing the position of each of the measured features that forms the measured pattern with the position of the corresponding features that form the adjusted pattern of features to determine whether the measured pattern of features is within the specified tolerance of the desired ideal pattern of the features.

25. An apparatus for determining whether a pattern of holes in a workpiece is within a predetermined tolerance, said apparatus comprising:
   a numerically controlled device including:
      a probe which takes samples of an edge of each hole that forms the pattern of holes; and
      encoders which indicate a position of said probe for each of the samples;
   a remote central processing unit including a memory array, said central processing unit electrically coupled to said numerically controlled device, said processing unit performing the operations of:
   calculating a measured centerpoint of each of the holes that form the pattern using the position of the samples indicated by said encoders;
   storing the measured centerpoint of each of the holes that form the pattern of holes numerically in the memory array along with an ideal centerpoint numerical value corresponding to each measured centerpoint;
   translating the numerical value of each ideal centerpoint in said memory array such that the numerical value of a designated ideal centerpoint is identical to a corresponding measured centerpoint;
   calculating an angular difference between an ideal vector between the designated ideal centerpoint and another ideal centerpoint and a measured vector corresponding to the ideal vector between the designated ideal centerpoint and the another ideal centerpoint;
   rotating the shifted ideal centerpoint of each of the holes in the pattern numerically by the angular difference to a numerically adjusted centerpoint; and
   comparing the measured centerpoint of each of the holes in the pattern with a corresponding numerically adjusted centerpoint to determine whether the measured pattern of holes is within the predetermined tolerance.

* * * * *